(12) United States Patent
Hosomizo et al.

(10) Patent No.: US 11,836,555 B2
(45) Date of Patent: Dec. 5, 2023

(54) INFORMATION PROCESSING DEVICE OUTPUTTING PRECEDING OPERATION COMMAND TO PRINTER BEFORE STARTING TRANSMITTING PRINT EXECUTION DATA

(71) Applicant: BROTHER KOGYO KABUSHIKI KAISHA, Nagoya (JP)

(72) Inventors: Yoshito Hosomizo, Nagoya (JP); Mareyuki Murata, Ogaki (JP); Kenju Narita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/320,467

(22) Filed: May 14, 2021

(65) Prior Publication Data

US 2021/0357712 A1    Nov. 18, 2021

(30) Foreign Application Priority Data

May 15, 2020   (JP) ................................ 2020-086100
May 15, 2020   (JP) ................................ 2020-086101

(51) Int. Cl.
*G06K 15/02*   (2006.01)
*G06F 3/12*    (2006.01)
(Continued)

(52) U.S. Cl.
CPC ....... *G06K 15/1805* (2013.01); *G06F 3/1204* (2013.01); *G06F 3/1222* (2013.01);
(Continued)

(58) Field of Classification Search
None
See application file for complete search history.

(56) References Cited

U.S. PATENT DOCUMENTS

| | | | | |
|---|---|---|---|---|
| 8,571,424 | B2 * | 10/2013 | Sugiyama | .............. G03G 15/50 358/1.9 |
| 2004/0184081 | A1 | 9/2004 | Yamamoto | |

(Continued)

FOREIGN PATENT DOCUMENTS

| | | |
|---|---|---|
| JP | 2000-163225 A | 6/2000 |
| JP | 2006-127478 A | 5/2006 |

(Continued)

OTHER PUBLICATIONS

Revised International Search Report dated Jul. 20, 2021 which issued in related PCT/JP2021/018397 together with English language translation.

(Continued)

*Primary Examiner* — Haris Sabah
(74) *Attorney, Agent, or Firm* — Scully, Scott, Murphy & Presser, PC

(57) ABSTRACT

In an information processing device, a support program supports a printer, and a printing program is built in an operating system. The support program causes the information processing device to perform: in a case that a print instruction to execute printing by using the built-in printing program is issued, at least one of a command outputting process and an outputting instruction process. The command outputting process outputs a preceding operation command to the printer before starting transmitting print execution data to the printer. The preceding operation command commands the printer to execute a preceding operation prior to starting printing. The printer having a function to execute the preceding operation specified in the preceding operation command. The outputting instruction process instructs a command transmission program to output the preceding operation command while the outputting instruction process designates the printer as an outputting destination.

23 Claims, 11 Drawing Sheets

(51) Int. Cl.
*H04N 1/00* (2006.01)
*G06F 1/3215* (2019.01)

(52) U.S. Cl.
CPC .......... *G06F 3/1232* (2013.01); *G06F 3/1238* (2013.01); *H04N 1/0044* (2013.01); *G06F 1/3215* (2013.01); *G06K 15/1803* (2013.01)

(56) References Cited

U.S. PATENT DOCUMENTS

| | | | |
|---|---|---|---|
| 2006/0066899 A1 | 3/2006 | Yoshida | |
| 2008/0003033 A1* | 1/2008 | Aizawa | G03G 15/5004 400/62 |
| 2011/0093727 A1* | 4/2011 | Hwang | G03G 15/5087 713/320 |
| 2012/0224217 A1* | 9/2012 | Oba | G06F 3/1211 358/1.15 |
| 2015/0378654 A1 | 12/2015 | Asai | |
| 2016/0127581 A1* | 5/2016 | Suzuki | H04W 4/80 358/1.15 |
| 2016/0216919 A1* | 7/2016 | Zakharov | G06F 3/1232 |
| 2017/0223210 A1 | 8/2017 | Yamada | |
| 2018/0329657 A1 | 11/2018 | Morimoto | |
| 2019/0030307 A1 | 10/2019 | Kato | |
| 2019/0303076 A1 | 10/2019 | Kato | |
| 2019/0361636 A1* | 11/2019 | Ren | G06F 3/1287 |

FOREIGN PATENT DOCUMENTS

| | | |
|---|---|---|
| JP | 2006-215752 A | 8/2006 |
| JP | 2016-012189 A | 1/2016 |
| JP | 2017-134718 A | 8/2017 |
| JP | 2018-190285 A | 11/2018 |
| JP | 2019-175330 A | 10/2019 |

OTHER PUBLICATIONS

International Search Report and Written Opinion dated Jul. 20, 2021 which issued in related PCT/JP2021/018397 together with English language translation.

* cited by examiner

INFORMATION PROCESSING DEVICE OUTPUTTING PRECEDING OPERATION COMMAND TO PRINTER BEFORE STARTING TRANSMITTING PRINT EXECUTION DATA

CROSS REFERENCE TO RELATED APPLICATION

This application claims priorities from Japanese Patent Applications No. 2020-086100 filed May 15, 2020 and No. 2020-086101 filed May 15, 2020. The entire contents of the priority applications are incorporated herein by reference.

TECHNICAL FIELD

The present disclosure relates to a support program, an information processing device, a printing method for supporting a control of printer.

BACKGROUND

One technology widely known in the art for controlling a printer from an information processing device such as a personal computer (PC) has a configuration for installing a printer driver on the information processing device, generating print data by using the printer driver, and transmitting the print data to the printer. Since the printer driver is provided by the manufacturer of the printer, the driver can support the various functions possessed by the printer in order to sufficiently utilize that printer.

SUMMARY

In recent years, practical technologies have been developed for controlling printers with a printing program incorporated as a standard feature in the operating system (OS), rather than using the printer driver described above. In these technologies, when detecting a printer, the OS associates the printer with the OS-standard printing program. Subsequently, when a print instruction is received for that printer, the information processing device can print using the OS-standard printing program rather than a printer driver.

However, the OS-standard printing program cannot always utilize all of the printing functions possessed by the printer. In some cases, the OS-standard printing program cannot support functions specific to the printer, for example, and consequently cannot fully utilize the intended capacity of the printer.

In view of the foregoing, it is an object of the present disclosure to provide a technology for an information processing device provided with an OS-standard printing program that can make full use of a printer's capabilities when printing with this printing program.

In order to attain the above and other objects, the disclosure provides a non-transitory computer readable storage medium storing a support program installed on and executed by a computer in an information processing device. The support program supports a printer connected to the information processing device. The information processing device includes a communication interface and an operating system installed therein. A printing program is built in the operating system. The support program, when executed by the computer, causes the information processing device to perform: in a case that a print instruction to execute printing on the printer by using the built-in printing program is issued, at least one of a command outputting process and an outputting instruction process. The command outputting process is to output a preceding operation command to the printer via the communication interface before starting transmitting print execution data to the printer. The print execution data is based on print data which the operating system generates according to the built-in printing program. The preceding operation command is for commanding the printer to execute a preceding operation prior to starting printing, the printer having a function to execute the preceding operation corresponding to the preceding operation command. The outputting instruction process is to instruct a command transmission program to output the preceding operation command while outputting instruction process designates the printer as an outputting destination. The command transmission program has a function to output the preceding command to the printer which is designated as the outputting destination.

According to another aspect, the disclosure provides an information processing device. The information processing device includes a communication interface, a memory, and a computer. The memory stores an operating system and a support program. The support program supports a printer connected to the information processing device. A printing program is built in the operating system. The support program, when executed by the computer, causes the information processing device to perform: in a case that a print instruction to execute printing on the printer by using the built-in printing program is issued, at least one of a command outputting process and an outputting instruction process. The command outputting process is to output a preceding operation command to the printer via the communication interface before starting transmitting print execution data to the printer. The print execution data is based on print data which the operating system generates according to the built-in printing program. The preceding operation command is for commanding the printer to execute a preceding operation prior to starting printing. The printer has a function to execute the preceding operation specified in the preceding operation command. The outputting instruction process is to instruct a command transmission program to output the preceding operation command while the outputting instruction process designates the printer as an outputting destination. The command transmission program has a function to output the preceding command to the printer which is designated as the outputting destination. The command transmission program, when executed by the computer, causes the information processing device to perform: in a case that the support program instructs the command transmission program to output the preceding operation command, outputting the preceding command to the designated printer via the communication interface.

According to another aspect, the disclosure provides a printing method for controlling an information processing device on which a support program is installed. The support program supports a printer connected to the information processing device. The information processing device includes an operating system installed therein. A printing program is built in the operating system. The printing method includes: in a case that a print instruction to execute printing on the printer by using the built-in printing program is issued, performing at least one of a command outputting process and an outputting instruction process according to the support program. The command outputting process is to output a preceding operation command to the printer from the information processing device before starting transmitting print execution data to the printer, the print execution data being based on print data which the operating system generates according to the built-in printing program. The preceding operation command is for commanding the printer to execute a preceding operation prior to starting printing. The printer has a function to execute the preceding operation specified in the preceding operation command. The outputting instruction process is to instruct a command transmission program to output the preceding operation command while the outputting instruction process designates the printer as an outputting destination. The printing method further includes, in a case that the support program instructs the command transmission program to output the preceding operation command, outputting the preceding command to the designated printer according to the command transmission program.

According to another aspect, the disclosure provides a non-transitory computer readable storage medium storing a program set installed on and executed by a computer in an information processing device, the program set comprising a support program and a command transmission program. The support program supports a printer connected to the information processing device. The information processing device includes a communication interface and an operating system installed therein. A printing program is built in the operating system. The support program, when executed by a computer, causes the information processing device to perform: in a case that a print instruction to execute printing on the printer by using the built-in printing program is issued, an outputting instruction process to output a preceding operation command to instruct the command transmission program to output a preceding operation command while outputting instruction process designates the printer as an outputting destination, the preceding operation command being for commanding the printer to execute a preceding operation prior to starting printing. The command transmission program, when executed by a computer, causes the information processing device to perform: in a case that the support program instructs the command transmission program to output the preceding operation command, a command outputting process to output the preceding command to the designated printer, the printer having a function to execute the preceding operation specified in the preceding operation command.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, a printing system using a program according to the embodiment will be described while referring to the accompanying drawings. The printing system described in the embodiment includes a personal computer (hereinafter "PC") and a printer.

Figure 1:
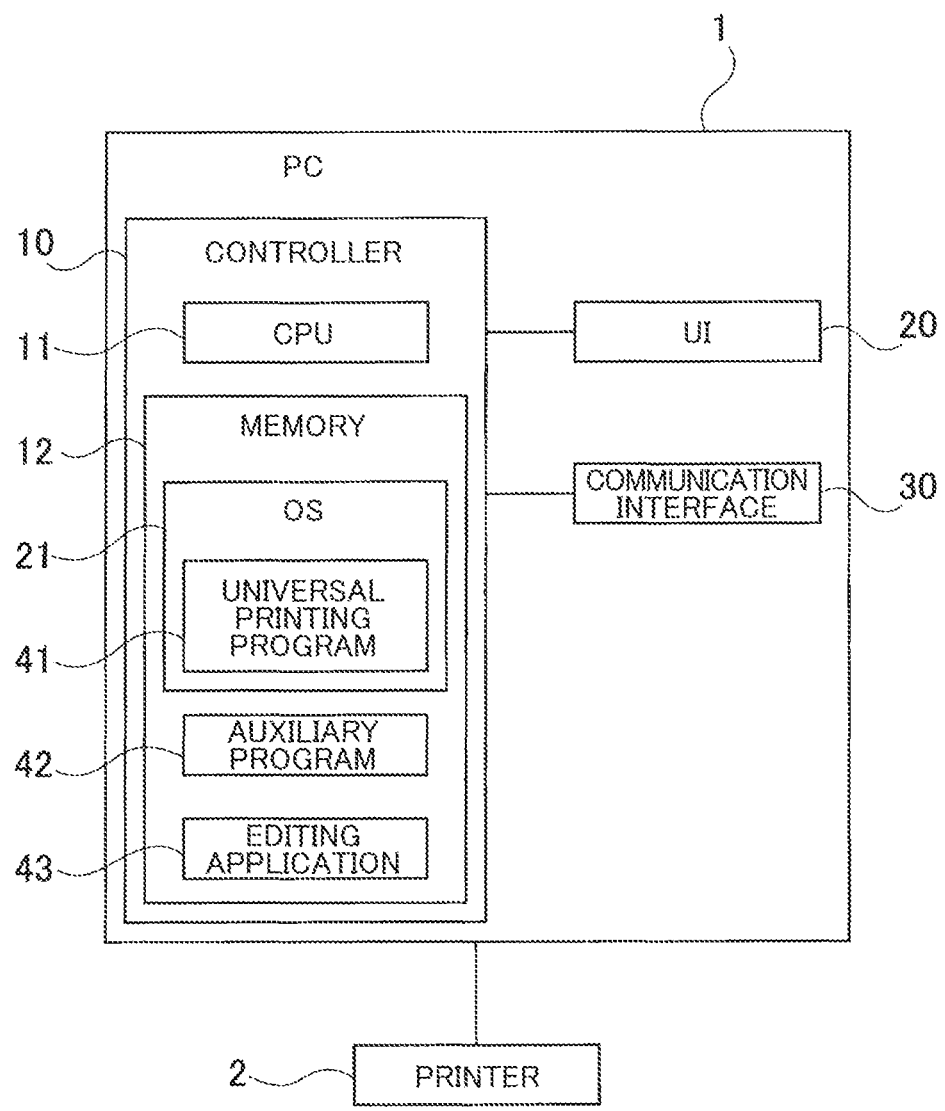
FIG. 1 is a block diagram illustrating a printing system according to a first embodiment.

FIG. 1 shows a sample structure of a printing system on which the program according to the embodiment is executed. The system shown in FIG. 1 includes a PC 1, and a printer 2. The PC 1 is an example of the information processing device. The printer 2 is a device having a printing function and is capable of communicating with the PC 1 through local communication or network communication.

As shown in FIG. 1, the PC 1 is provided with a controller 10, a user interface 20, and a communication interface 30, for example. The user interface 20 and the communication interface 30 are electrically connected to the controller 10.

The user interface 20 includes hardware for displaying various information and for receiving instructions inputted by the user. The user interface 20 may be a touchscreen having both a display function and an input receiving function or may be a combination of a display having a display function; and a keyboard, mouse, and the like having input receiving functions.

The communication interface 30 includes hardware for communicating with the printer 2, and hardware for accessing the Internet. The communication interface 30 may include a plurality of interfaces with different communication methods. Methods of communication are network communication and USB communication, for example. The communication interface 30 may also include hardware for performing wireless communication, such as Wi-Fi (registered trademark) or Bluetooth (registered trademark).

The controller 10 includes a CPU 11, and a memory 12. The CPU 11 is an example of the computer. The memory 12 includes ROM, RAM, and nonvolatile memory for storing various programs such as application programs (hereinafter called "applications"), various data, and the like. This specification will not focus on details of the memory. The CPU 11 executes various processes according to programs read from the memory 12 and/or instructions received from the user. Note that the controller 10 in FIG. 1 is a general concept that covers the hardware and software used for controlling the PC 1 and does not necessarily represent a single piece of hardware present in the PC 1.

The memory 12 may be any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

As shown in FIG. 1, the memory 12 stores an operating system (hereinafter "OS") 21, an auxiliary program 42, and an editing application 43, for example. The OS 21 includes a universal printing program 41. The auxiliary program 42 is an example of a support program. For example, the auxiliary program 42 may be a hardware support application (HSA) having specifications disclosed by Microsoft Corporation. The OS 21 is Microsoft Windows (registered trademark), macOS (registered trademark), or Linux (registered trademark), for example. In addition to the programs mentioned above, the memory 12 may also store various data including information on connected devices, and other programs such as a browser.

The CPU 11 performs each step in the processes or flowcharts described below according to instructions in the programs such as the auxiliary program 42. In the following description, actions such as "determine," "extract," "select," "calculate," "decide," "identify," "acquire," "receive," "control," and the like represent processes performed by the CPU 11. Processes performed by the CPU 11 include processes that control hardware using APIs of the OS 21. In this specification, the operations of the programs executed by the CPU 11 are described while omitting the details of the OS 21. That is, the expressions such as "the program B controls the hardware C" may indicate "the program B controls the hardware C by using the API of the OS 21". Further, a process executed by the CPU 11 according to instructions described in a program may be described using abbreviated expressions, such as "the CPU 11 executes". The process executed by the CPU 11 according to the instructions described in the program may be described in the abbreviated expressions without mentioning the CPU 11 such as "the program A executes".

Note that the term "acquire" in this specification is used as a concept that does not necessarily require a request. In other words, a process by which the CPU 11 receives data without requesting that data is included in the concept of "the CPU 11 acquires data." The term "data" described herein is expressed as bit strings that can be read by a computer. Data of different formats are treated as the same data when the content of the data is essentially the same. The same holds true for "information" in this specification. A "request," an "instruction," or the like is processed by outputting information indicating the "request," or the "instruction". The terms "request" and "instruction" may also be used to describe information indicating a "request" or an "instruction".

Further, a process performed by the CPU 11 to determine whether information A indicates circumstance B may be described conceptually as "determining whether circumstance B based on information A." A process in which the CPU determines whether information A indicates circumstance B or circumstance C may be described conceptually as "determining whether circumstance B or circumstance C based on information A."

The universal printing program 41 is an application that enables the PC 1 to execute printing operations on various printers, including the printer 2. The universal printing program 41 is an OS-standard printing program built into the OS 21. In the embodiment, the universal printing program 41 generates print data that is supported by the printer based on the target image data. The universal printing program 41 is an example of the printing program.

The universal printing program 41 is a general-purpose application that is compatible with printers of a plurality of models provided by various device vendors. The universal printing program 41 controls the printers to execute operations common to the plurality of models. Alternatively, the universal printing program 41 may be a program that the vendor of each device provides to the vendor of the OS 21 in order to be integrated in the OS 21. For example, the universal printing program 41 may be a type of printer driver provided to be built into the OS 21 in advance.

On the other hand, a vendor-developed program for each device can be added to the PC 1 in the form of an installation after the universal printing program 41 to be integrated in the OS 21 has been provided to the vendor of the OS 21. In the following description, a printer driver that can be added through installation rather than a program included in the OS 21 will simply be called a "printer driver" or a "vendor driver." In other words, a printer driver is not a program built into the OS 21 in advance but is a program that must be installed in the OS 21 through a prescribed procedure before the program can be used. At this time, the OS 21 or an installer specified via the user interface 20 installs the printer driver in the OS 21, for example. The printer driver is a program prepared by the vendor of the printer for each individual model of printer and may be capable of receiving commands for device-specific functions possessed by the corresponding model.

In some cases, the printer driver, i.e., the vendor driver, may perform better than the universal printing program 41 integrated in the OS 21. Better performance may mean that print data generated by the printer driver can be processed more efficiently by the printer than print data generated by the universal printing program 41 and can improve printing speed. Better performance may mean that the printer can process the print data by using a smaller memory capacity. Print data generated by the printer driver may be able to control the printer to print results in better color or in higher resolution. The printer driver may be able to command the printer to perform functions specific to the printer driver that the universal printing program 41 cannot command the printer to execute. Examples of some driver-specific functions are a mirror print function and a negative/positive reversal print function.

The auxiliary program 42 is a program that executes processes based on commands from the OS 21 in response to operations of the universal printing program 41. The auxiliary program 42 is an application that supports the control of targeted hardware. The auxiliary program 42 is started up by the OS 21, for example. The auxiliary program 42 is an application supporting each model of the printer 2 and the like and is prepared by the vendor of the printer 2 and other devices. The device vendor registers the auxiliary program 42 on a platform provided by the vendor of the OS 21 in accordance with a procedure specified by the vendor of the OS 21. When a printer 2 is newly connected to the PC 1 and the auxiliary program 42 supporting this printer 2 is registered on the platform, the OS 21 downloads the auxiliary program 42 from a server storing the auxiliary program 42 and installs the auxiliary program 42 on the PC 1.

The OS 21 stores identification information for the incorporated auxiliary program 42 in the memory 12 in association with printer information about the newly connected printer 2. When printers of a plurality of models are connected to the PC 1, an auxiliary program for each of the models is incorporated in the PC 1 and information associating each printer with the corresponding auxiliary program is stored in the memory 12. Thus, the memory 12 stores model information and access information for printers and information about the corresponding auxiliary programs 42 as the printer information for printers connected to the PC 1.

The editing application 43 is used for creating or editing image data or document data, for example. Examples of the editing application 43 include Microsoft Word (registered trademark) and PowerPoint (registered trademark). The editing application 43 receives user operations that include instructions to execute prescribed operations on the printer 2. Specifically, the editing application 43 receives print instructions via the user interface 20 for executing printing operations on the printer 2, for example.

Figure 2:
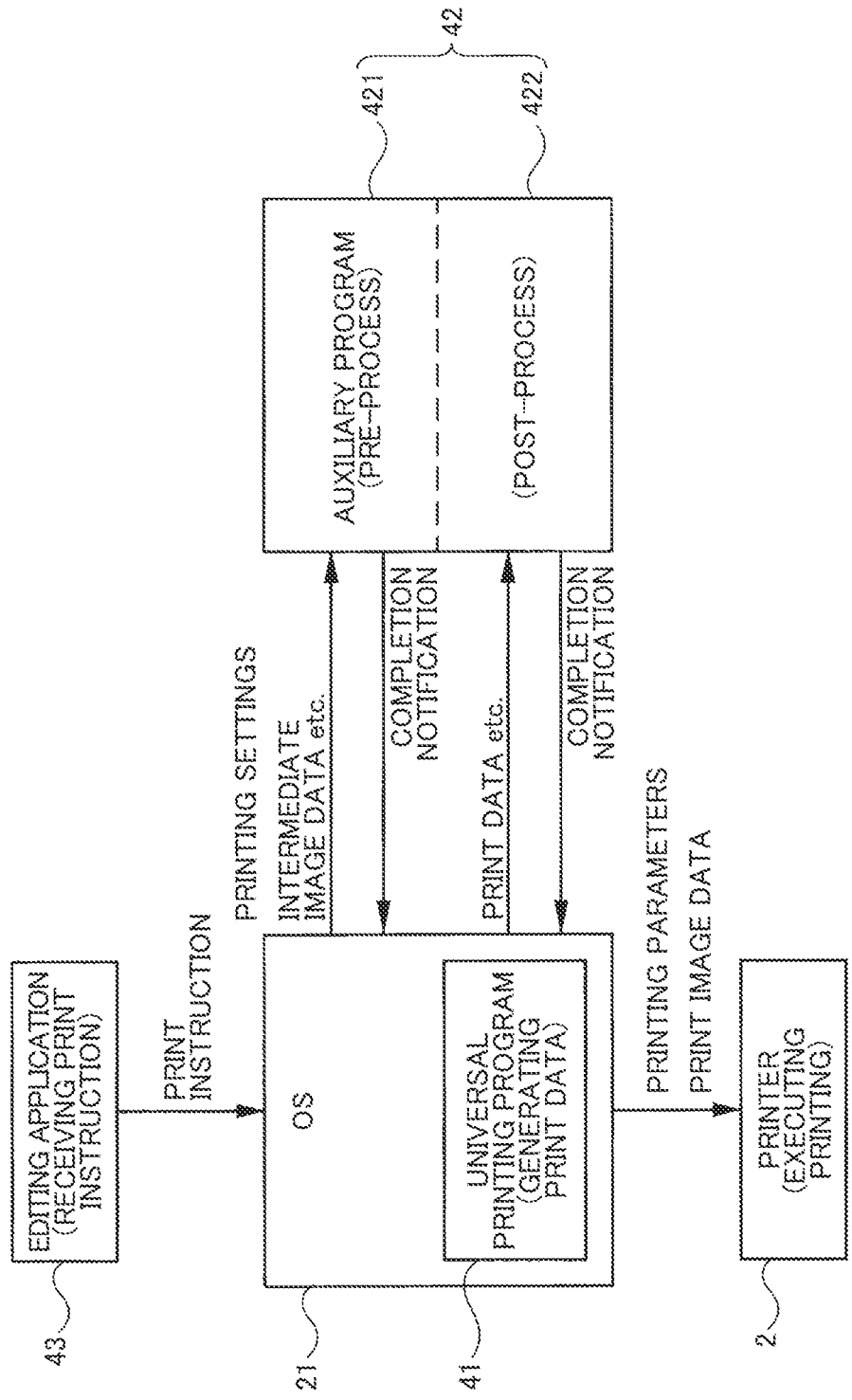
FIG. 2 is an explanatory diagram illustrating a process for printing according to each program.

Next, steps in a process for printing according to each program will be described with reference to FIG. 2. In the following example, the PC 1 receives a print instruction in the editing application 43 via the user interface 20 to execute a print on the printer 2 using the universal printing program 41.

Upon receiving the print instruction, the editing application 43 transfers a print execution notification to the OS 21 based on the received print instruction. The print execution notification includes information about the printer specified in the print instruction, printing parameters, and information specifying the target image data.

In a case that the auxiliary program 42 supporting the printer specified in the print instruction is stored in the memory 12, the OS 21 instructs the auxiliary program 42 to execute the process according to the auxiliary program 42 before the universal printing program 41 generates print data using the universal printing program 41.

The auxiliary program 42 includes a pre-process executed before the process by the universal printing program 41 starts, and a post-process executed after the process by the universal printing program 41 is completed and before the OS 21 transmits print image data to the printer 2. In the following description, the process of the auxiliary program 42 executed before the process by the universal printing program 41 will be described as a process according to a pre-process auxiliary program 421, and the process executed after completion of the process performed by the universal printing program 41 will be described as a process according to a post-process auxiliary program 422.

In response to reception of a print instruction, the PC 1 of the embodiment executes the pre-process according to the pre-process auxiliary program 421 prior to generating print data by the universal printing program 41. The pre-process auxiliary program 421 can acquire various information included in the print instruction, such as printing parameters and printer information, and can also acquire intermediate image data from the OS 21 based on the target image data. The pre-process auxiliary program 421 executes the pre-process based on the acquired information and its own program and returns a completion notification to the OS 21 upon completing the pre-process. Details of the pre-process according to the pre-process auxiliary program 421 will be described later.

Upon receiving a completion notification from the pre-process auxiliary program 421, the OS 21 executes the process according to the universal printing program 41. The universal printing program 41 generates print data based on the print instruction.

Once the print data has been generated, the OS 21 executes the post-process according to the post-process auxiliary program 422 prior to transmitting print image data based on the generated print data to the printer 2. In addition to printing parameters and printer information, the post-process auxiliary program 422 can acquire the generated print data from the OS 21. The post-process auxiliary program 422 executes the post-process based on the acquired information and its own program and returns a completion notification to the OS 21 after completing the post-process. Details of the post-process performed by the post-process auxiliary program 422 will be described later.

In response to reception of the completion notification from the post-process auxiliary program 422, the OS 21 transmits the printing parameters and the print image data to the printer 2 via the communication interface 30 while correlating the printing parameters with the print image data. The print image data may be the print data itself or may be data representing a processed version of the image specified by the print data. For example, in a case that a watermark is combined with the image to be printed in the post-process, the print image data is data representing this composite image. Further, the printing parameters may be modified from the settings in the editing application 43 by the pre-process auxiliary program 421 or the post-process auxiliary program 422. The printer 2 executes a print based on the printing parameters and the print image data received from the OS 21.

Next, a printing process, which includes operations of the auxiliary program 42, performed on the printing system will be described according to a first embodiment with reference to the sequence diagram of FIG. 3. The following description assumes that the printer 2 is selected as the printer to execute the print job.

First, the editing application 43 receives a specification for image data to be printed and settings for printing parameters via the user interface 20 (arrow A). In addition to general settings such as the number of copies to print, the printing parameters include settings specific to the printer 2 and the auxiliary program 42 supporting the printer 2.

In order to receive settings specific to the printer 2 and to the auxiliary program 42 supporting the printer 2, the editing application 43 receives a command to switch to advanced settings. In response to reception of a command to switch to advanced settings, the editing application 43 transmits an execution command for specifying the settings of printing parameters to the OS 21 in order to output the execution command to the auxiliary program 42 via the OS 21 (arrow B).

In response to reception the execution command for specifying settings of printing parameters, the auxiliary program 42 executes a settings process with the pre-process auxiliary program 421 (arrow C). In this process, the auxiliary program 42 displays a settings screen on the user interface 20 for receiving settings for printing parameters and receives the inputted printing parameter settings followed by an instruction to quit the settings process. Settings that the auxiliary program 42 can receive include settings for functions specific to the auxiliary program 42 and the printer 2.

As printing parameters specific to the auxiliary program 42, the auxiliary program 42 can receive a setting indicating whether to enable a preview function for displaying the image to be printed on the user interface 20 prior to transmitting the print image data, and a designation for a secure print in which password input is a condition for executing the printing operation. In a case that a designation for a secure print is received, the auxiliary program 42 also receives a password setting. The inputted password is added to the printing parameters. Additionally, the auxiliary program 42 may receive settings for functions equivalent to those possessed by the printer driver as printing parameters specific to the auxiliary program 42.

After receiving an instruction to quit the settings process, the auxiliary program 42 transmits a completion notification to the OS 21 in order to respond to the editing application 43 via the OS 21 with a completion notification (arrow D). On the other hand, in a case that the editing application 43 did not receive an instruction to switch to the advanced settings, the processes indicated by arrows B, C, and D are skipped.

Subsequently, the editing application 43 receives an instruction to execute a print via the user interface 20 (arrow E). In a case that the editing program 43 receives an instruction to execute a print, the editing application 43 transfers a print execution notification to the OS 21 (arrow F). The print execution notification includes the established printing parameters and information representing the image data to be printed. The print execution notification is an example of the print instruction.

When the OS 21 detects the print execution notification outputted from the editing application 43, the OS 21 identifies the printer designated as the device to execute printing based on the information included in the print execution notification. For example, in a case that the information specifies that the universal printing program 41 is to be used to print on the printer 2, the OS 21 outputs an execution command to execute the process according to the auxiliary program 42 provided that an auxiliary program 42 supporting the printer 2 is installed (arrow G).

In a case that the execution command is outputted for the auxiliary program 42 itself, the auxiliary program 42 executes the process of the pre-process auxiliary program 421 or the post-process auxiliary program 422. In this example, the OS 21 outputs a pre-process execution command to the auxiliary program 42 to start the pre-process with the pre-process auxiliary program 421 prior to generating the print data.

The pre-process auxiliary program 421 executes the pre-process using the information about the printer 2, printing parameters, and image data transferred from the OS 21 (arrow H). The image data acquired from the OS 21 is intermediate image data that the OS 21 has converted to an intermediate data format from the image data format transferred from the editing application 43. Some examples of pre-processes may be image processing based on the printing parameter settings, such as enlarging or reducing an image or combining images. A pre-process may also be a process for displaying a settings screen for printing parameters on the user interface 20 and receiving modifications for printing parameter settings. After executing the pre-process, the pre-process auxiliary program 421 transfers a completion notification to the OS 21 (arrow I).

In response to reception of the completion notification from the pre-process auxiliary program 421, the OS 21 uses the universal printing program 41 to generate print data (arrow J). The print data generated by the universal printing program 41 is universal print data that printers 2 of various types can use to print.

After generating the print data with the universal printing program 41, the OS 21 outputs another command to execute the process of the auxiliary program 42 (arrow K). Specifically, after completing generation of the print data, the OS 21 outputs a post-process execution command to the auxiliary program 42 to start the post-process according to the post-process auxiliary program 422.

The post-process auxiliary program 422 executes the post-process using information about the printer 2, printing parameters, and print data transferred from the OS 21. As the post-process, the post-process auxiliary program 422 according to the embodiment generates print image data based on the print data acquired from the OS 21. In addition, in a case that the preview function is enabled, the post-process auxiliary program 422 executes a preview process to display an image represented by the generated print image data on the user interface 20 (arrow L).

In the preview process, the post-process auxiliary program 422 uses the user interface 20 to display an image represented by the print image data and to accept a user selection to execute or cancel the print through the user interface 20. That is, the post-process auxiliary program 422 receives a user operation through the user interface 20. In a case that the print option is selected, the OS 21 uses the model information and IP address of the printer 2 acquired from the OS 21 to output a preceding operation command to the printer 2 via the communication interface 30 instructing the printer 2 to execute a preceding operation (arrow M). The preceding operation is an operation for preparing to print prior to receiving print image data.

The printer 2 starts the preceding operation in response to receiving the preceding operation command from the PC 1 (arrow N). By performing this preceding operation, the printer 2 can reduce the wait time from the moment the user inputs a print instruction until the first page has been printed.

The preceding operation may include a plurality of types corresponding to different models of printers 2, for example. In a case that the printer 2 is an inkjet printer, for example, the preceding operation may entail removing a cap from the print head used to prevent the ink from drying and moving the print head to a print start position. In a case that the printer 2 is an electrophotographic printer, for example, the preceding operation may entail preheating the fixing unit. In other words, there may be a plurality of types of preceding operation commands since the executable preceding operation differs among models of printers. The auxiliary program 42 stores preceding operation commands in association with model names. Irrespective of the printing method employed by the printer 2, a preceding operation may involve identifying a paper tray based on the printing parameters and conveying a sheet of paper from the identified paper tray to a prescribed cuing position, for example.

In a case that a plurality of types of preceding operation commands is applicable to the printer 2, the post-process auxiliary program 422 may output all types of commands or may receive designation for the preceding operation command(s) to be outputted to the printer 2 in advance through a settings screen or the like. Here, in a case that the printer 2 is to be instructed to execute a plurality of preceding operations, the plurality of preceding operation commands may be transmitted sequentially or may be combined and transmitted as a single preceding operation command. The printer 2 has a function for performing at least one preceding operation. When a preceding operation command is received, the printer 2 performs the preceding operation corresponding to that command.

In a case that the user has selected the print option in the preview process, the post-process auxiliary program 422 transfers a completion notification to the OS 21 (arrow O). In response to reception of the completion notification from the post-process auxiliary program 422, the OS 21 transmits the print image data to the printer 2 (arrow P) and ends the process initiated with the print execution notification. After receiving the print image data, the printer 2 performs a print based on the received print image data (arrow Q).

On the other hand, in a case that the cancel option is selected in the preview process, the post-process auxiliary program 422 transfers a cancel notification to the OS 21 (arrow R). In response to reception of a cancel notification from the post-process auxiliary program 422, the OS 21 ends the process based on the print execution notification without transmitting print image data to the printer 2. In this case, the printer 2 does not perform a print.

Figure 3:
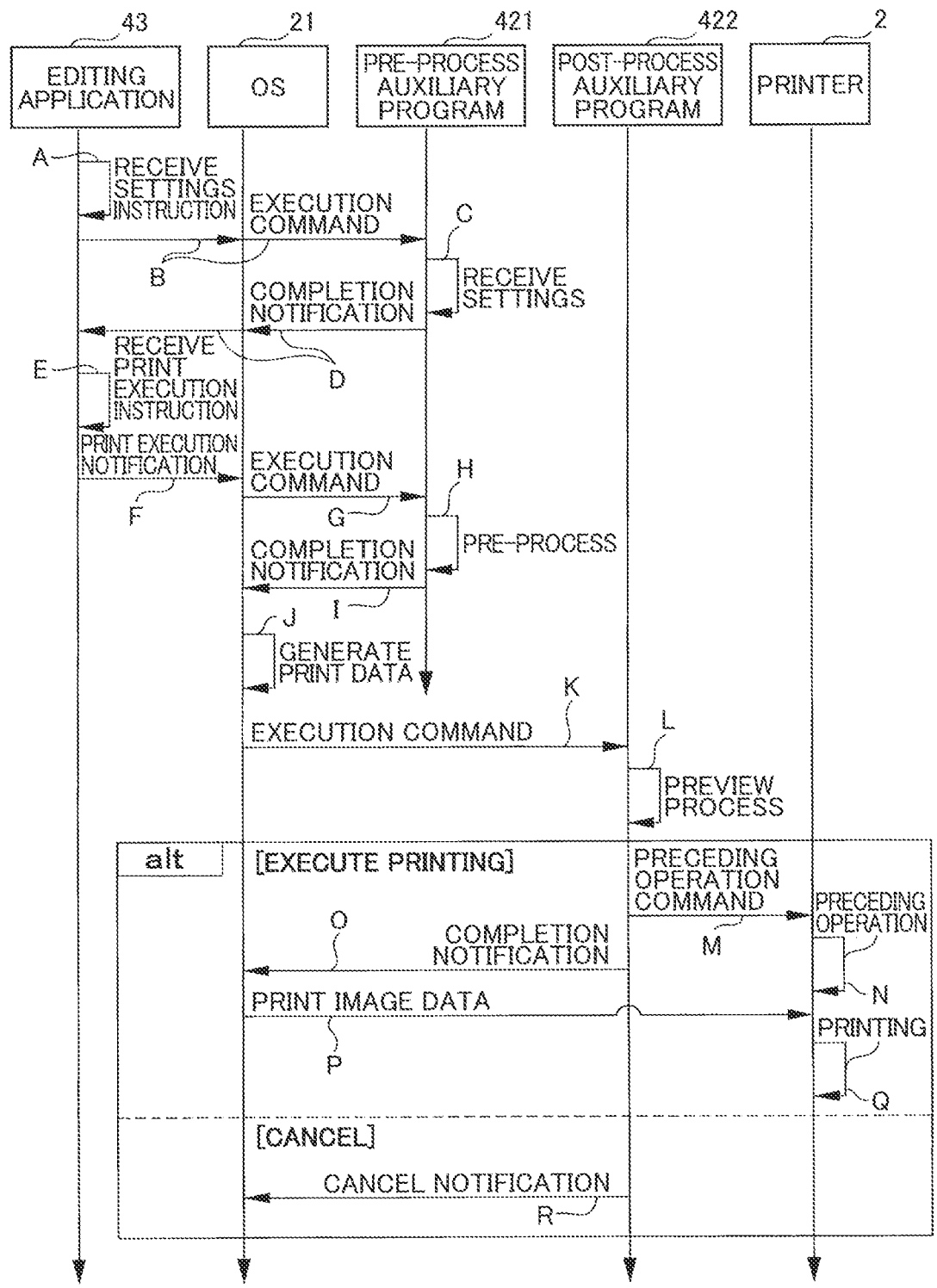
FIG. 3 is a sequence diagram illustrating exemplary operation of each program according to the first embodiment.

Note that the post-process auxiliary program 422 outputs the preceding operation command prior to transferring a completion notification to the OS 21 in the process shown in FIG. 3, but the post-process auxiliary program 422 may output the preceding operation command after transferring a completion notification to the OS 21. Further, in a case that the preview function is not enabled, the post-process auxiliary program 422 does not execute the preview process to display a preview, but simply outputs the preceding operation command to the printer 2 and transfers the completion notification to the OS 21.

Further, in a case that the printer 2 has a device-specific function, such as a colorant saving mode, the post-process auxiliary program 422 may transmit a command to the printer 2 in the post-process for enabling this device-specific function.

Figure 4:
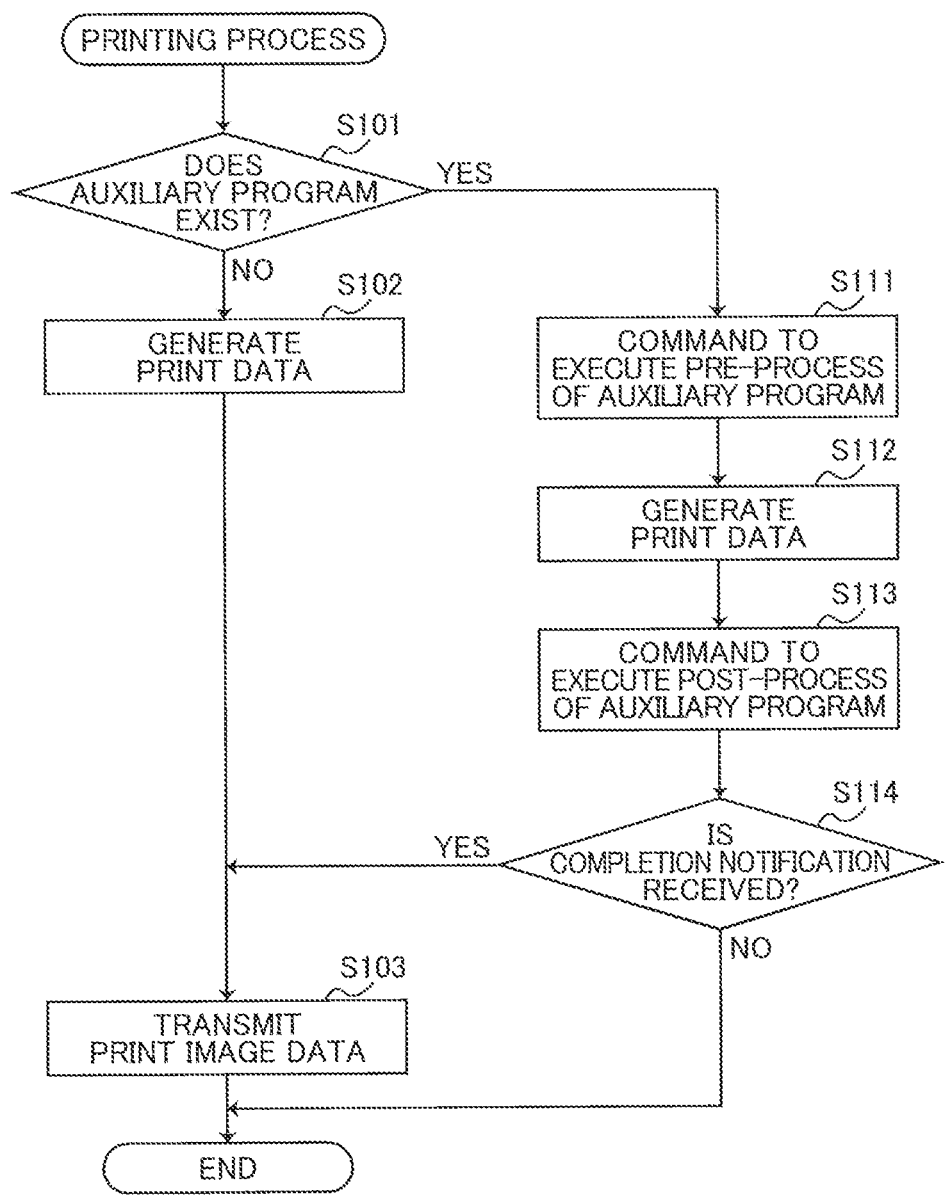
FIG. 4 is a flowchart illustrating a printing process according to the first embodiment.

Next, steps in the printing process executed by the OS 21 will be described with reference to the flowchart in FIG. 4. The printing process is part of the process executed by the printing system according to the first embodiment described above. The CPU 11 of the PC 1 executes the printing process according to the OS 21 triggered by an event that the OS 21 receives a print execution notification from the editing application 43 (arrow F) in FIG. 3.

In S101 at the beginning of the printing process, the OS 21 determines whether the memory 12 has the auxiliary program 42. The auxiliary program 42 is prepared by the device vendor to support each printer, as described above. In a case that the OS 21 detects a new printer, the OS 21 installs the auxiliary program 42 corresponding to the detected printer on the PC 1.

In a case that the CPU 11 determines that the auxiliary program 42 is not stored in the memory 12, such as a case that an auxiliary program 42 supporting the printer 2 has not been prepared (S101: NO), in S102 the OS 21 generates print data using the universal printing program 41. In S103 the OS 21 transmits the generated print data or print image data based on the print data to the printer 2, and subsequently ends the printing process. The OS 21 may also execute a prescribed error process in a case that transmission of the print image ends in failure.

Since print data is generated using the universal printing program 41 in a case that the auxiliary program 42 is not installed on the PC 1, the user can use various types of printers 2 in the same manner without being conscious of setting up the printers 2. However, printing using the universal printing program 41 may require more time and may yield a worse quality in printing results than when printing according to a high-performance printer driver.

In a case that the CPU 11 determines in S101 that the auxiliary program 42 is stored in the memory 12 (S101: YES), in S111 (arrow G in FIG. 3) the OS 21 outputs the execution command to the auxiliary program 42 corresponding to the printer 2 to start the pre-process with the pre-process auxiliary program 421. As a result, the CPU 11 executes the pre-process according to the pre-process auxiliary program 421. To execute the process of the pre-process auxiliary program 421, the OS 21 may input information specifying the pre-process auxiliary program 421 into the auxiliary program 42, for example. Alternatively, the OS 21 may store information specifying the pre-process auxiliary program 421 in the memory 12 and may output the execution command to the pre-process auxiliary program 421, and the pre-process auxiliary program 421 may read the information from the memory 12. Alternatively, the OS 21 may output an execution command designating the pre-process of the pre-process auxiliary program 421.

In a case that the OS 21 receives the completion notification from the pre-process auxiliary program 421 after the pre-process auxiliary program 421 has started executing the pre-process, in S112 (arrow J in FIG. 3), the OS 21 generates print data using the universal printing program 41 included in the OS 21. S112 is the same process performed in S102. Here, in a case that a cancel notification was received from the pre-process auxiliary program 421, the OS 21 ends the printing process without generating print data.

After generating the print data, in S113 (arrow K in FIG. 3) the OS 21 outputs the execution command to the auxiliary program 42 supporting the printer 2 to start the post-process according to the post-process auxiliary program 422 prior to transmitting print image data based on the generated print data to the printer 2. Accordingly, the CPU 11 executes the post-process according to the post-process auxiliary program 422.

After the post-process auxiliary program 422 has started executing the post-process, in S114 the OS 21 waits for a notification transmitted from the post-process auxiliary program 422 and determines whether the received notification is a completion notification or a cancel notification. In a case that the OS 21 determines that a completion notification was received (S114: YES), in S103 (arrow P in FIG. 3) the OS 21 transmits print data or print image data based on the print data to the printer 2, and subsequently ends the printing process. However, in a case that the OS 21 determines that a cancel notification was received (S114: NO), the OS 21 ends the printing process without transmitting the print image data.

Figure 5:
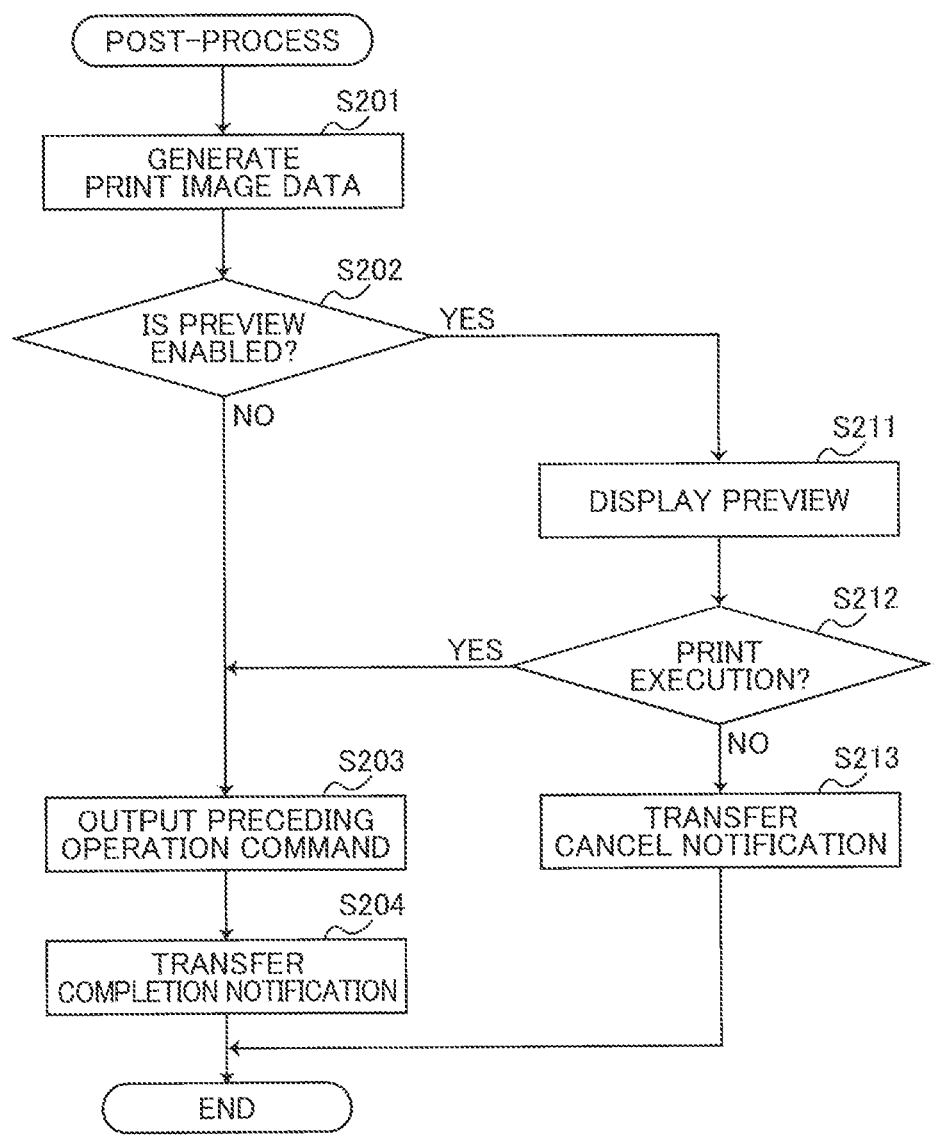
FIG. 5 is a flowchart illustrating a post-process according to the first embodiment.

Next, the post-process according to the auxiliary program 42 executed on the printing system of the embodiment will be described with reference to the flowchart in FIG. 5. The CPU 11 of the PC 1 executes the post-process according to the post-process auxiliary program 422 constituting part of the auxiliary program 42 triggered by an event that the auxiliary program 42 receives the execution command from the OS 21 (arrow K in FIG. 3).

In S201 of the post-process, the post-process auxiliary program 422 generates the print image data based on the print data generated by the universal printing program 41 according to the printing parameters. In S201 the post-process auxiliary program 422 performs a process to combine a watermark, and header or footer to the image represented by the print data, for example. Note that, in a case that the image represented by the print data is not to be processed, step S201 may be skipped and the post-process auxiliary program 422 may set the print image data to the unaltered print data or may generate a duplicate of the print data.

In S202 the post-process auxiliary program 422 determines whether the preview function is enabled. In a case that the preview function is enabled (S202: YES), in S211 (arrow L in FIG. 3) the post-process auxiliary program 422 performs a preview display by displaying an image represented by the print image data generated in S201 on the user interface 20 and receiving a user selection for print or cancel option. Step S211 is an example of the preview process. In S212 the auxiliary program 42 determines whether the user selection was the print option.

In a case that the post-process auxiliary program 422 determines that the user selected the print option (S212: YES) or a case that the preview function is not enabled (S202: NO), in S203 (arrow M in FIG. 3) the post-process auxiliary program 422 acquires printer information about the printer 2 specified as the device for executing the print, and outputs the preceding operation command to the printer 2. Step S203 is an example of the command outputting process. Specifically, the post-process auxiliary program 422 requests model information about the printer 2 and the IP address or other access information of the printer 2 from the OS 21 or references storage locations in which the OS 21 stores these pieces of information. Next, the post-process auxiliary program 422 sets the preceding operation command suited to the printer model and printing parameters and outputs the preceding operation command using the access information.

After the process of S202, in S204 (arrow O in FIG. 3), the post-process auxiliary program 422 transfers the completion notification to the OS 21 and subsequently ends the post-process. However, in a case that the post-process auxiliary program 422 determines in S212 that the user selected the cancel option (S212: NO), in S213 (arrow R in FIG. 3) the post-process auxiliary program 422 transfers the cancel notification to the OS 21, and subsequently ends the post-process.

In the first embodiment described above, in a case that a print instruction is issued to perform the printing operation on the printer 2 using the universal printing program 41, the auxiliary program 42 outputs the preceding operation command to the printer 2 targeted in the print instruction to execute a printer-specific preceding operation before starting to transmit to the printer 2 print image data based on the print data generated by the universal printing program 41. Accordingly, the PC 1 can command the printer 2 to execute a printer-specific preceding operation prior to starting a print based on the print instruction even in a case that the PC 1 received the print instruction to execute the print using the universal printing program 41, thereby utilizing the intended capacity of the printer.

Further, the auxiliary program 42 of the first embodiment outputs a preceding operation command after the OS 21 has generated print data and the user has completed operations in the preview process. In other words, in a case that the preview function has been enabled, execution of the printing process is confirmed after the print data has been generated and not before. Accordingly, the preceding operation command is transmitted after the print data has been generated to avoid needlessly performing the preceding operation on the printer. Further, in a case that the user operation in the preview process is to be received before the print image data is transmitted, sending the preceding operation command early may result in the preceding operation being performed needlessly if the wait time for receiving the user operation is too long. Accordingly, transmitting the preceding operation command after the user operation is received prevents the printer from needlessly performing the preceding operation.

Figure 6:
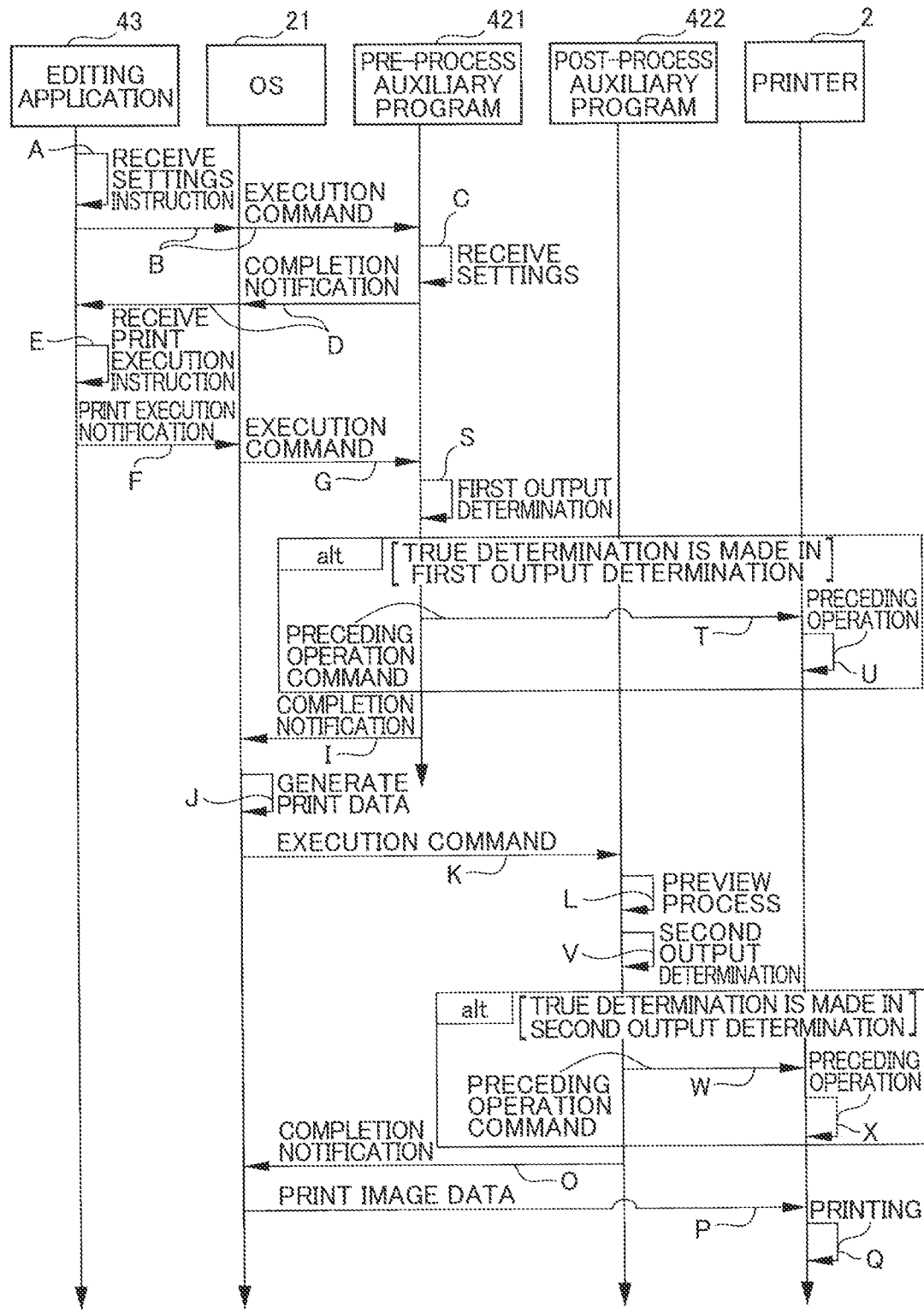
FIG. 6 is a sequence diagram illustrating exemplary operation of each program according to a modification of the first embodiment.

Next, a printing process performed on the printing system that includes the auxiliary program 42 will be described according to a modification of the first embodiment with reference to the sequence diagram of FIG. 6. The modification of the first embodiment differs from the first embodiment in that the preceding operation command is outputted in the pre-process. Note that steps in FIG. 6 that are identical to those in the first embodiment shown in FIG. 3 are designated with the same reference symbols. Further, since steps in the modification of the first embodiment from arrow A to arrow G are identical to those in the first embodiment shown in FIG. 3, a description of these steps will be omitted.

In a case that the OS 21 outputs a command to execute the pre-process to the auxiliary program 42 (arrow G), the pre-process auxiliary program 421 of the auxiliary program 42 performs a first output determination as part of the pre-process to determine whether neither a delayed output condition nor a restriction condition is met (arrow S). The delayed output condition requires the preceding operation command to be outputted after the print data is generated. The restriction condition requires that output of the preceding operation command be restricted. In a case that a true determination is made in the first output determination, i.e., a case that neither the delayed output condition nor restriction condition is met, the pre-process auxiliary program 421 outputs the preceding operation command to the printer 2 during the pre-process (arrow T). In response to reception of the preceding operation command from the PC 1, the printer 2 starts the preceding operation (arrow U). On the other hand, in a case that a false determination is made in the first output determination, i.e., a case that at least one of the delayed output condition and restriction condition is met, the pre-process auxiliary program 421 does not output the preceding operation command.

In the embodiment, the delayed output condition corresponds to the preview function being enabled. In a case that the preview process is executed, there is a possibility that the user could cancel the print, making the preceding operation on the printer 2 unnecessary if the preceding operation command was outputted before the preview process. Even in a case that the user selects the print option, the preceding operation may be wasted if the user takes too much time to make the selection.

In other words, the delayed output condition is a condition related to at least one of a situation that a print is canceled and a situation that the wait time for a user operation is long. The delayed output condition is an example of the first condition. If the PC 1 possesses a function other than the preview function that displays a message confirming whether print image data should be transmitted and receives a user input operation prior to transmitting the print image data, the delayed output condition may be whether that function is enabled. Note that in a case that a user input operation to modify a printing parameter is received during the pre-process, the pre-process auxiliary program 421 determines whether the delayed output condition is met after such reception is complete.

Further, the restriction condition in the modification of the first embodiment corresponds to whether a secure print has been specified. When a secure print is specified, the printer 2 first receives the print image data and then accepts an inputted password. In a case that the inputted password matches the password included in the printing parameters, the printer 2 performs the print based on the print image data. Hence, in a case that a secure print has been specified, the printer 2 does not start printing immediately after receiving the print image data. Consequently, the pre-process auxiliary program 421 can determine to restrict transmission of the preceding operation command since there is no need to perform the preceding operation.

In other words, the restriction condition corresponds to a condition in which the printer 2 does not start printing as long as another condition is not met, despite having received the print image data. The restriction condition is an example of the second condition. In addition to or instead of a secure print being specified, the restriction condition may include a condition that a scheduled print has been specified in order to print at a specified time, for example. Alternatively, the restriction condition may include a condition that printing is performed without waiting for password input but does not start until the user performs an input operation to execute the print. Alternatively, the restriction condition may include a condition that the printer 2 has already started executing the print. This is because it is unnecessary to perform a preceding operation while printing is being executed. The restriction condition may also include a condition that printing cannot be performed because of an error such as an out-of-paper or paper jam error. This is because the printer 2 cannot start printing immediately even having performed the preceding operation.

After completing execution of the pre-process, the pre-process auxiliary program 421 transfers a completion notification to the OS 21 (arrow I). In response to reception of the completion notification from the pre-process auxiliary program 421, the OS 21 generates print data using the universal printing program 41 (arrow J) and outputs an execution command for the post-process to the auxiliary program 42 (arrow K).

In a case that an execution command for the post-process is outputted, the post-process auxiliary program 422 of the auxiliary program 42 executes the preview process as part of the post-process (arrow L). Note that the preview process is skipped in a case that the preview function is disabled.

The post-process auxiliary program 422 further performs a second output determination as part of the post-process to determine whether an output execution condition is satisfied and a restriction condition is not satisfied (arrow V). The output execution condition is a condition for outputting the preceding operation command. The restriction condition is a condition for restricting output of the preceding operation command. In a case that a true determination is made in the second output determination, the post-process auxiliary program 422 outputs the preceding operation command to the printer 2 during the post-process (arrow W). In response to reception of the preceding operation command from the PC 1, the printer 2 starts the preceding operation (arrow X).

The output execution condition of the modification of the first embodiment corresponds to a condition that execution of the print is selected in the preview process. In a case that the preview process is executed, the post-process auxiliary program 422 receives an instruction to print or cancel the print after the print data has been generated. Accordingly, the post-process auxiliary program 422 can determine whether the preceding operation command can be transmitted according to whether execution of the print is selected.

Further, the restriction condition in the post-process of the modification of the first embodiment corresponds to the same restriction condition in the pre-process but also includes a condition that the preceding operation command was transmitted during the pre-process. In a case that the preceding operation command was already transmitted in the pre-process, there is no need to transmit another preceding operation command in the post-process. It is determined that the restriction condition in the post-process is not met in a case that neither the same restriction condition in the pre-process nor the condition that the preceding operation command was transmitted during the pre-process is not met. Hence, the post-process auxiliary program 422 can determine that transmission of the preceding operation command is unnecessary when the preceding operation command was already sent.

In a case that the user has not selected the cancel option in the preview process before execution of the post-process is complete, the post-process auxiliary program 422 transfers a completion notification to the OS 21 (arrow O). In response to reception of the completion notification from the post-process auxiliary program 422, the OS 21 transmits the print image data to the printer 2 (arrow P) and ends the process initiated by the print execution notification. After receiving the print image data, the printer 2 starts printing based on the received data (arrow Q). While not shown in the drawings, in a case that the cancel option is selected in the preview process before the post-process ends, the post-process auxiliary program 422 transfers a cancel notification to the OS 21. In response to reception of the cancel notification, the OS 21 ends the process initiated by the print execution notification without transmitting the print image data.

With the auxiliary program 42 according to the modification of the first embodiment described above, in a case that the print instruction is issued to perform a print on the printer 2 using the universal printing program 41, the auxiliary program 42 outputs the preceding operation command to the printer 2 before starting to transmit the print image data to the printer 2. Accordingly, when the PC 1 receives a print instruction to perform a print using the universal printing program 41, the printer 2 can execute its printer-specific preceding operation prior to starting a print based on the print instruction, thereby utilizing the full capacity of the printer.

The auxiliary program 42 of the embodiment also determines whether the delayed output condition has been met prior to the OS 21 generating the print data. In a case that the delayed output condition is not met, the auxiliary program 42 can transmit the preceding operation command to the printer 2 even before the OS 21 has generated the print data. In other words, the decision to execute the print may be made prior to generating the print data depending on the printing conditions. By transmitting the preceding operation command prior to generating the print data in such cases, the preceding operation on the printer can be immediately started so that the printing operation can start more quickly.

The auxiliary program 42 of the modification of the first embodiment also determines whether a restriction condition has been met. In a case that the restriction condition has been met, the auxiliary program 42 does not transmit the preceding operation command to the printer 2, regardless of whether the delayed output condition and the output execution condition are met. In other words, the printer 2 may not start printing immediately after receiving print image data in some cases depending on the printing conditions. In such cases, the auxiliary program 42 does not transmit the preceding operation command to prevent the printer 2 from needlessly executing the preceding operation.

In the first embodiment and the modification of the first embodiment, the auxiliary program 42 receives device-specific printing parameters (arrow C) prior to receiving the print instruction (arrow E). The device-specific printing parameters include an instruction indicating whether the preview function is enabled to display an image of the print target on the user interface 20 prior to transmitting the print image data, and a designation for a secure print requiring a password to be inputted to execute the print. However, these printing parameters may be received as part of the pre-process (arrow H or S) performed after the print instruction is received.

In the first embodiment and the modification of the first embodiment, the auxiliary program 42 is configured to receive the device-specific printing parameters including the setting for enabling the preview function and the setting for a secure print, but all or some of these settings may be received by the OS 21 instead.

A second embodiment of the printer 2 will be described while referring to FIGS. 7-11. The following description of the second embodiment will focus on points of difference from the first embodiment, wherein like parts and components are designated with the same reference numerals to avoid duplicating description.

Figure 7:
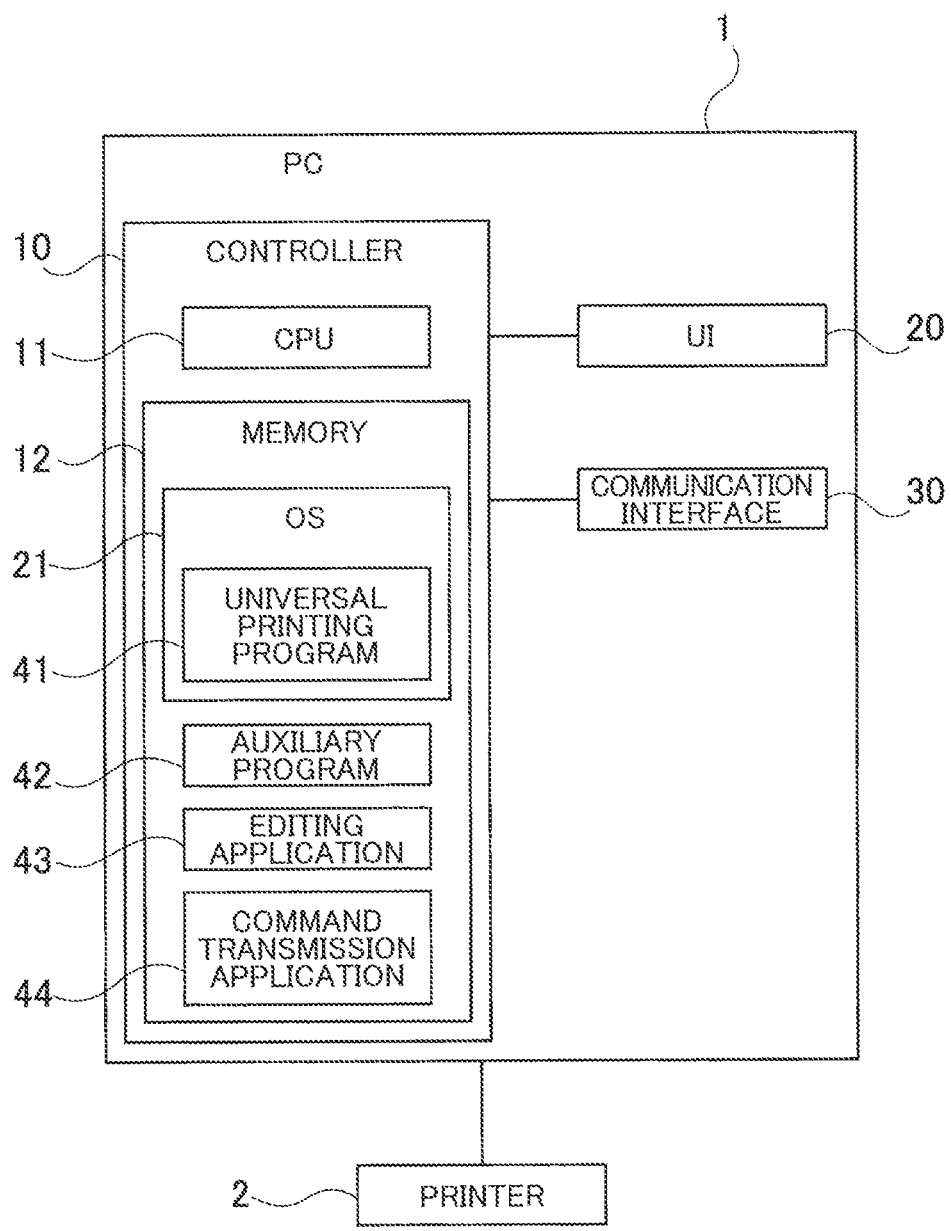
FIG. 7 is a block diagram illustrating a printing system according to a second embodiment.

As shown in FIG. 7, the printer 2 according to the second embodiment is the same as that of the first embodiment except the configuration of the memory 12. Specifically, in the second embodiment, the memory 12 stores a command transmission application 44 in addition to the OS 21, the auxiliary program 42, and the editing application 43.

In the second embodiment, the post-process auxiliary program 422 does not transmits to the printer 2 commands such as the preceding operation command Instead of the post-process auxiliary program 422, the command transmission application 44 transmits such commands to the printer 2.

The command transmission application 44 is a program for transmitting various commands to designated devices. The command transmission application 44 is started up from the auxiliary program 42, for example. The command transmission application 44 is prepared by the vendor of the printer 2 and other devices and is installed in combination with the auxiliary program 42, for example. When printers of a plurality of models are connected to the PC 1, a command transmission program for each model may be installed on the PC 1, or a universal command transmission program for all models may be installed on the PC 1. The command transmission application 44 is an example of the command transmission program.

Figure 8:
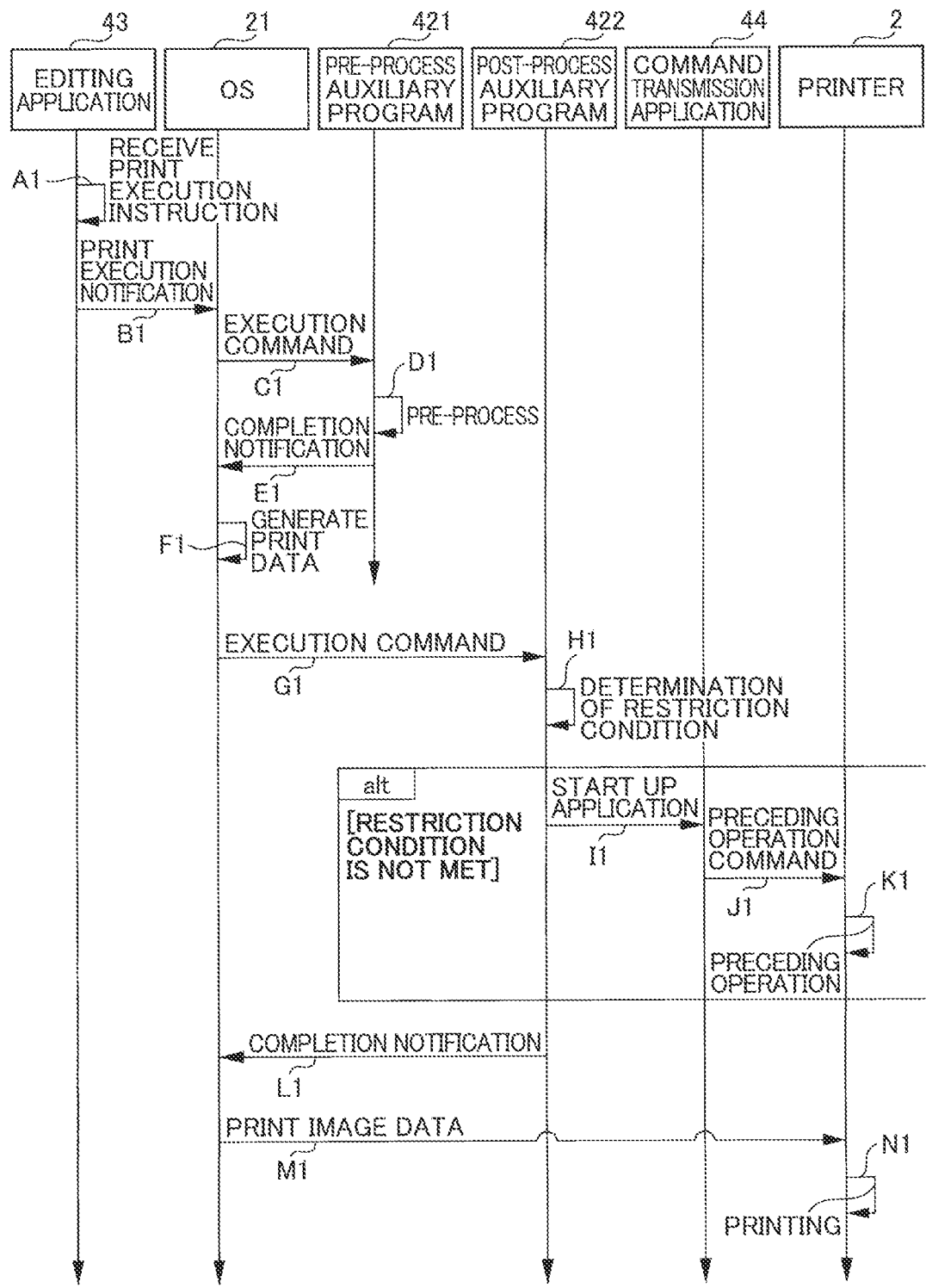
FIG. 8 is a sequence diagram illustrating exemplary operation of each program according to the second embodiment.

Next, a printing process, which includes operations of the auxiliary program 42, performed on the printing system will be described according to a second embodiment with reference to the sequence diagram of FIG. 8. The following description assumes that the printer 2 is selected as the printer to execute the print job.

First, the editing application 43 receives an instruction to execute a print via the user interface 20 (arrow A1). In a case that the instruction to execute a print is received, the editing application 43 transfers a print execution notification to the OS 21 (arrow B1). The print execution notification is an example of the print instruction.

Note that the editing application 43 may receive a specification for the image data to be printed and settings for printing parameters prior to receiving the print instruction to execute a print. Information representing these printing parameters and the image data to be printed may be included in the print execution notification. In addition to general settings, such as the number of copies to print, the printing parameters include settings specific to the printer 2 and settings specific to the auxiliary program 42 supporting the printer 2. Printing parameters specific to the auxiliary program 42 may be a setting indicating whether to enable a preview function for displaying the image to be printed on the user interface 20 prior to transmitting the print data, and a designation for a secure print in which password input is a condition for executing the printing operation. In a case that a designation for a secure print is received, a password is included in the printing parameters. Additionally, settings for functions equivalent to a printer driver may be included as printing parameters specific to the auxiliary program 42.

When the OS 21 detects the print execution notification outputted from the editing application 43, the OS 21 identifies the printer designated as the device to execute printing based on the information included in the print execution notification. For example, in a case that the information specifies that the universal printing program 41 is to be used to print on the printer 2, the OS 21 outputs an execution command to execute the process according to the auxiliary program 42 provided that an auxiliary program 42 supporting the printer 2 is installed (arrow C1).

In a case that the execution command is outputted for the auxiliary program 42 itself, the auxiliary program 42 executes the process of the pre-process auxiliary program 421 or the post-process auxiliary program 422. In this example, the OS 21 outputs a pre-process execution command to the auxiliary program 42 to start the pre-process with the pre-process auxiliary program 421 prior to generating the print data.

The pre-process auxiliary program 421 executes the pre-process using the information about the printer 2, printing parameters, and image data transferred from the OS 21 (arrow D1). The image data acquired from the OS 21 is intermediate image data that the OS 21 has converted to an intermediate data format from the image data format transferred from the editing application 43. Some examples of pre-processes may be image processing based on the printing parameter settings, such as enlarging or reducing an image or combining images. A pre-process may also be a process for displaying a settings screen for printing parameters on the user interface 20 and receiving modifications for printing parameter settings. After executing the pre-process, the pre-process auxiliary program 421 transfers a completion notification to the OS 21 (arrow E1).

In response to reception of the completion notification from the pre-process auxiliary program 421, the OS 21 uses the universal printing program 41 to generate print data (arrow F1). The print data generated by the universal printing program 41 is universal print data that printers 2 of various types can use to print.

After generating the print data with the universal printing program 41, the OS 21 outputs another command to execute the process of the auxiliary program 42 (arrow G1). Specifically, after completing generation of the print data, the OS 21 outputs a post-process execution command to the auxiliary program 42 to start the post-process according to the post-process auxiliary program 422.

The post-process auxiliary program 422 executes the post-process using information about the printer 2, printing parameters, and print data transferred from the OS 21. As the post-process, the post-process auxiliary program 422 generates print image data based on the print data acquired from the OS 21. In addition, the post-process auxiliary program 422 determines whether a restriction condition restricting output of the preceding operation command is satisfied (arrow H1).

Similarly to the modification of the first embodiment, the restriction condition in the second embodiment corresponds to whether a secure print has been specified. When a secure print is specified, the printer 2 first receives the print image data and then accepts an inputted password. In a case that the inputted password matches the password included in the printing parameters, the printer 2 performs the print based on the print image data. Hence, in a case that a secure print has been specified, the printer 2 does not start printing immediately after receiving the print image data. Consequently, the pre-process auxiliary program 421 can determine to restrict transmission of the preceding operation command since there is no need to perform the preceding operation.

In other words, the restriction condition corresponds to a condition in which the printer 2 does not start printing as long as another condition is not met, despite having received the print image data. In addition to or instead of a secure print being specified, the restriction condition may include a condition that a scheduled print has been specified in order to print at a specified time, for example. Alternatively, the restriction condition may include a condition that printing is performed without waiting for password input but does not start until the user performs an input operation to execute the print. Alternatively, the restriction condition may include a condition that the printer 2 has already started executing the print. This is because it is unnecessary to perform a preceding operation while printing is being executed. The restriction condition may also include a condition that printing cannot be performed because of an error such as an out-of-paper or paper jam error. This is because the printer 2 cannot start printing immediately even having performed the preceding operation.

In a case that the restriction condition is not met, the post-process auxiliary program 422 starts up the command transmission application 44 (arrow I1). Startup options may be added to the start command for the command transmission application 44. The startup options include transmission information about the method of transmitting commands, such as address information of the printer 2 to be the destination of commands, model information of the printer 2, and other information about the printer 2. The post-process auxiliary program 422 acquires the transmission information from the OS 21 prior to starting up the command transmission application 44.

When started up, the command transmission application 44 uses the model information about the printer 2 included in the startup options to create a preceding operation command instructing the printer 2 to execute a preceding operation and uses the address information included in the startup options to output this preceding operation command to the printer 2 via the communication interface 30 (arrow J1). The preceding operation is an operation for preparing the printer 2 to print prior to transmitting the print image data. After outputting the preceding operation command, the command transmission application 44 terminates automatically.

The printer 2 starts the preceding operation in response to receiving the preceding operation command from the PC 1 (arrow K1). By performing this preceding operation, the printer 2 can reduce the wait time from the moment the user inputs a print instruction until the first page has been printed.

Similarly to the modification of the first embodiment, the preceding operation may include a plurality of types corresponding to different models of printers 2, for example. In a case that the printer 2 is an inkjet printer, for example, the preceding operation may entail removing a cap from the print head used to prevent the ink from drying and moving the print head to a print start position. In a case that the printer 2 is an electrophotographic printer, for example, the preceding operation may entail preheating the fixing unit. In other words, there may be a plurality of types of preceding operation commands since the executable preceding operation differs among models of printers. The command transmission application 44 stores preceding operation commands in association with model names Irrespective of the printing method employed by the printer 2, a preceding operation may involve identifying a paper tray based on the printing parameters and conveying a sheet of paper from the identified paper tray to a prescribed cuing position, for example.

In a case that a plurality of types of preceding operation commands is applicable to the printer 2, the command transmission application 44 may output all types of commands or may receive designation for the preceding operation command(s) to be outputted to the printer 2 in advance through a settings screen or the like. Here, in a case that the printer 2 is to be instructed to execute a plurality of preceding operations, the plurality of preceding operation commands may be transmitted sequentially or may be combined and transmitted as a single preceding operation command. The printer 2 has a function for performing at least one preceding operation. When a preceding operation command is received, the printer 2 performs the preceding operation corresponding to that command.

After the post-process auxiliary program 422 has started the command transmission application 44, or in a case that the restriction condition is met, the post-process auxiliary program 422 transfers a completion notification to the OS 21 (arrow L1). In response to reception of the completion notification from the post-process auxiliary program 422, the OS 21 transmits the print image data to the printer 2 (arrow M1) and ends the process initiated with the print execution notification. After receiving the print image data, the printer 2 performs a print based on the received print image data (arrow N1).

Note that in the post-process the post-process auxiliary program 422 may perform a preview display to display an image based on the print image data. When performing a preview display, the post-process auxiliary program 422 receives through a user operation a selection indicating whether to execute or cancel the print. In a case that the user selects the print option, the post-process auxiliary program 422 starts up the command transmission application 44. In a case that the user selects the cancel option, the post-process auxiliary program 422 transfers a cancel notification rather than a completion notification to the OS 21 without starting up the command transmission application 44.

In the procedure described above, the command transmission application 44 creates a preceding operation command based on the model information for the printer 2. However, the post-process auxiliary program 422 may create the preceding operation command and include information about the type of preceding operation command in the startup options when starting up the command transmission application 44. In this case, the auxiliary program 42 stores the preceding operation command in association with the model name, and the command transmission application 44 outputs the preceding operation command based on information included in the startup options indicating the type of preceding operation command rather than having to generate the preceding operation command.

In the procedure described above, the command transmission application 44 is started up by the post-process auxiliary program 422 in order to output the preceding operation command as a post-process performed after the print data has been generated. However, the command transmission application 44 may be started up by the pre-process auxiliary program 421 to output the preceding operation command as a pre-process executed prior to generating the print data.

In the procedure described above, by having the auxiliary program 42 start up the command transmission application 44, the command transmission application 44 automatically outputs the preceding operation command according to the startup options. In other words, starting up the command transmission application 44 serves as a command to output the preceding operation command, but the startup command and output command may be separate. In this case, the auxiliary program 42 consecutively performs starting the command transmission application 44 and issuing a command to the command transmission application 44 to output the preceding operation command. Further, the transmission information included in the startup options for the command transmission application 44 may instead be included in the command for outputting the preceding operation command.

When started up by the auxiliary program 42, the command transmission application 44 automatically initiates the process for outputting the preceding operation command and, after completing this output, automatically terminates. However, the command transmission application 44 may be a resident application that is already started and continuously running in the background. In this case, the auxiliary program 42 outputs an execution command to the command transmission application 44 to output the preceding operation command. The command transmission application 44 outputs the preceding operation command based on the transmission information included in the execution command received from the auxiliary program 42. The command transmission application 44 does not terminate after completing this output.

Figure 9:
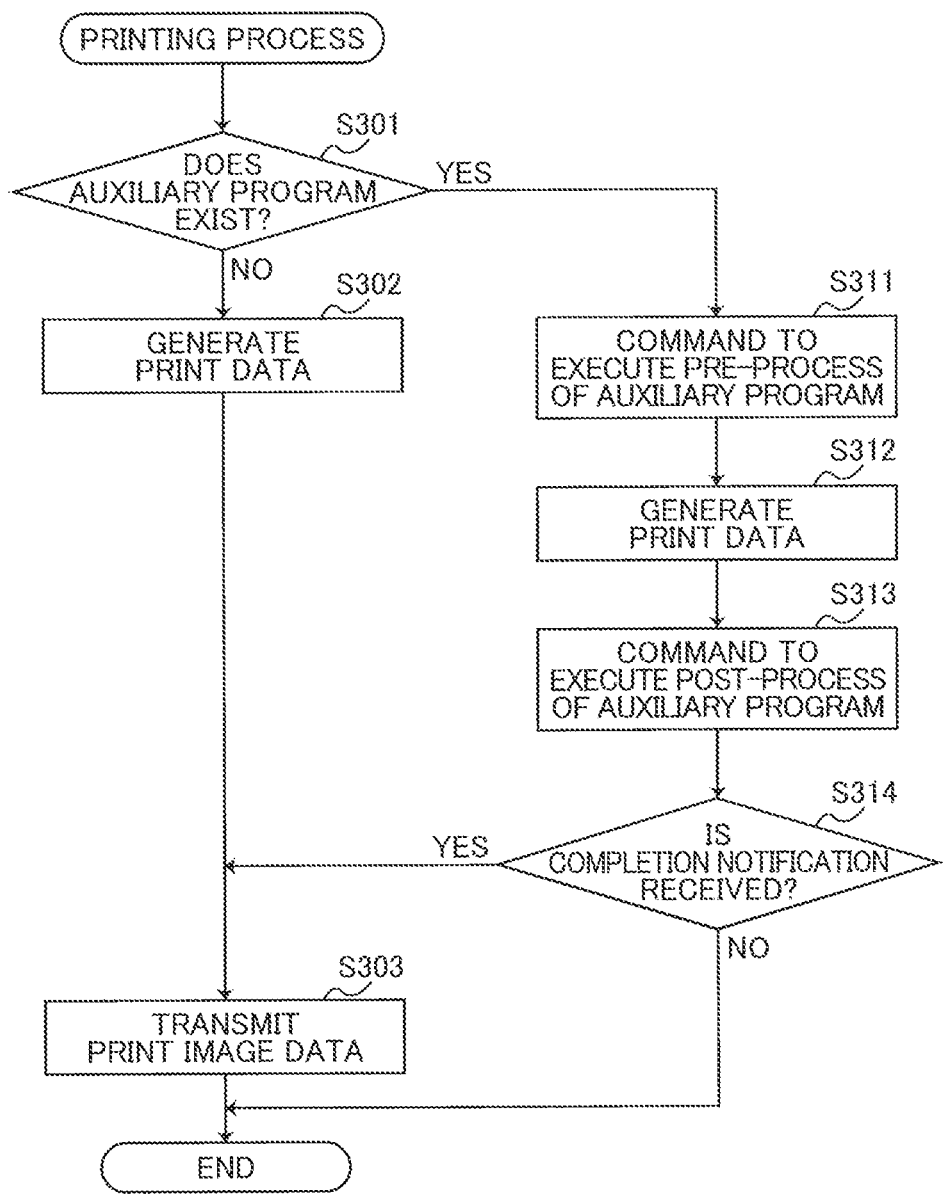
FIG. 9 is a flowchart illustrating a printing process according to the second embodiment.

Next, steps in the printing process executed by the OS 21 will be described with reference to the flowchart in FIG. 9. The printing process is part of the process executed by the printing system according to the second embodiment described above. The CPU 11 of the PC 1 executes the printing process according to the OS 21 triggered by an event that the OS 21 receives a print execution notification from the editing application 43 (arrow B1) in FIG. 8.

In S301 at the beginning of the printing process, the OS 21 determines whether the memory 12 has the auxiliary program 42. The auxiliary program 42 is prepared by the device vendor to support each printer, as described above. In a case that the OS 21 detects a new printer, the OS 21 installs the auxiliary program 42 corresponding to the detected printer on the PC 1.

In a case that the CPU 11 determines that the auxiliary program 42 is not stored in the memory 12, such as a case that an auxiliary program 42 supporting the printer 2 has not been prepared (S301: NO), in S302 the OS 21 generates print data using the universal printing program 41. In S303 the OS 21 transmits the generated print data or print image data based on the print data to the printer 2, and subsequently ends the printing process. The OS 21 may also execute a prescribed error process in a case that transmission of the print image ends in failure.

Since print data is generated using the universal printing program 41 in a case that the auxiliary program 42 is not installed on the PC 1, the user can use various types of printers 2 in the same manner without being conscious of setting up the printers 2. However, printing using the universal printing program 41 may require more time and may yield a worse quality in printing results than when printing according to a high-performance printer driver.

In a case that the CPU 11 determines in S301 that the auxiliary program 42 is stored in the memory 12 (S301: YES), in S311 (arrow C1 in FIG. 8) the OS 21 outputs the execution command to the auxiliary program 42 corresponding to the printer 2 to start the pre-process with the pre-process auxiliary program 421. As a result, the CPU 11 executes the pre-process according to the pre-process auxiliary program 421. To execute the process of the pre-process auxiliary program 421, the OS 21 may input information specifying the pre-process auxiliary program 421 into the auxiliary program 42, for example. Alternatively, the OS 21 may store information specifying the pre-process auxiliary program 421 in the memory 12 and may output the execution command to the pre-process auxiliary program 421, and the pre-process auxiliary program 421 may read the information from the memory 12. Alternatively, the OS 21 may output an execution command designating the pre-process of the pre-process auxiliary program 421.

In a case that the OS 21 receives the completion notification from the pre-process auxiliary program 421 after the pre-process auxiliary program 421 has started executing the pre-process, in S312 (arrow F1 in FIG. 8), the OS 21 generates print data using the universal printing program 41 included in the OS 21. S312 is the same process performed in S302. Here, in a case that a cancel notification was received from the pre-process auxiliary program 421, the OS 21 ends the printing process without generating print data.

After generating the print data, in S313 (arrow G1 in FIG. 8) the OS 21 outputs the execution command to the auxiliary program 42 supporting the printer 2 to start the post-process according to the post-process auxiliary program 422 prior to transmitting print image data based on the generated print data to the printer 2. Accordingly, the CPU 11 executes the post-process according to the post-process auxiliary program 422.

After the post-process auxiliary program 422 has started executing the post-process, in S314 the OS 21 waits for a notification transmitted from the post-process auxiliary program 422 and determines whether the received notification is a completion notification or a cancel notification. In a case that the OS 21 determines that a completion notification was received (S314: YES), in S303 (arrow M1 in FIG. 8) the OS 21 transmits print data or print image data based on the print data to the printer 2, and subsequently ends the printing process. However, in a case that the OS 21 determines that a cancel notification was received (S314: NO), the OS 21 ends the printing process without transmitting the print image data.

Figure 10:
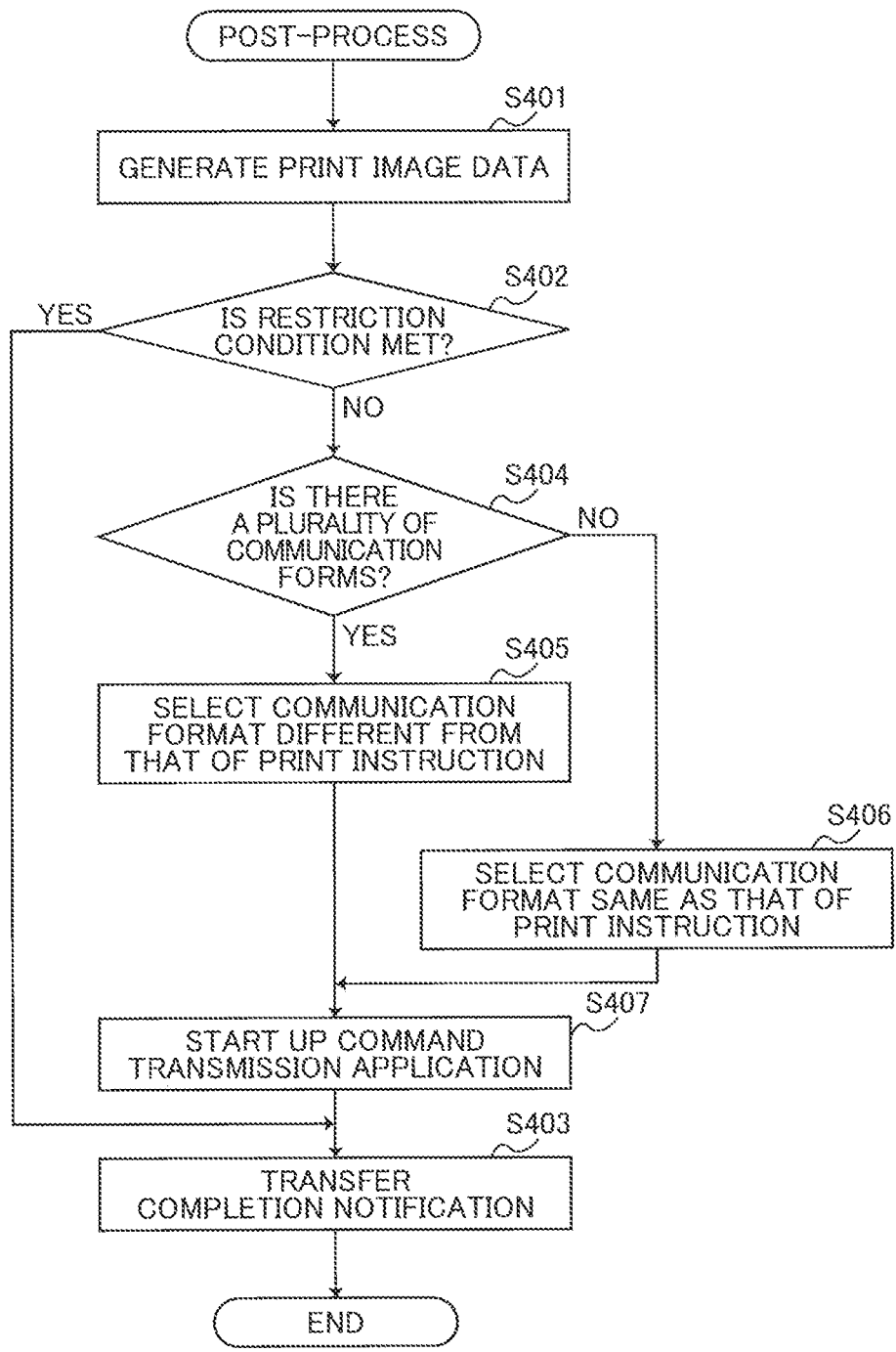
FIG. 10 is a flowchart illustrating a post-process according to the second embodiment.

Next, the post-process according to the auxiliary program 42 executed on the printing system will be described with reference to the flowchart in FIG. 10. The CPU 11 of the PC 1 executes the post-process according to the post-process auxiliary program 422 constituting part of the auxiliary program 42 triggered by an event that the auxiliary program 42 receives the execution command from the OS 21 (arrow G1 in FIG. 8).

In S401 of the post-process, the post-process auxiliary program 422 generates the print image data based on the print data generated by the universal printing program 41 according to the printing parameters. In S401 the post-process auxiliary program 422 performs a process to combine a watermark, and header or footer to the image represented by the print data, for example. Note that, in a case that the image represented by the print data is not to be processed, step S401 may be skipped and the post-process auxiliary program 422 may set the print image data to the unaltered print data or may generate a duplicate of the print data.

In S402 (arrow H1 in FIG. 8), the post-process auxiliary program 422 determines whether the restriction condition is met. In a case that the restriction condition is not met (S402: NO), in S404 the post-process auxiliary program 422 determines whether there is a plurality of communication formats (or manners) for communicating with the printer 2 specified as the device to execute the print. When making the determination in S404, differences in communication formats denote differences in the communication medium or communication method. Some examples of specific communication formats are USB and LAN ports for wired communication or Wi-Fi and Bluetooth for wireless communication. The determination in S404 is performed to determine whether the printer 2 has another communication format besides the communication format selected with the print instruction. For example, in a case that wireless communication by Wi-Fi has been selected through the print instruction and the post-process auxiliary program 422 can communicate with the printer 2 through a communication format other than Wi-Fi, the post-process auxiliary program 422 determines that there is a plurality of communication formats for communicating with the printer 2.

In a case that there is a plurality of communication formats of communicating with the printer 2 (S404: YES), in S405 the post-process auxiliary program 422 selects a communication format different from the communication format currently selected in the print instruction to use as the communication format for outputting the preceding operation command. However, in a case that there is only one communication format of communicating with the printer 2 (S404: NO), in S406 the post-process auxiliary program 422 selects the same communication format currently selected through the print instruction as the form for outputting the preceding operation command.

After selecting a communication format, in S407 (arrow I1 in FIG. 8), the post-process auxiliary program 422 starts up the command transmission application 44. S407 is an example of the output command process. Specifically, the post-process auxiliary program 422 acquires model information for the printer 2 and access information such as the IP address of the printer 2 by requesting to the OS 21 or referencing a storage site in which the OS 21 stores such information. The post-process auxiliary program 422 includes the model information of the printer 2, the access information of the printer 2, and the information specifying the selected communication format in the startup options, and starts up the command transmission application 44. The command transmission application 44 outputs a preceding operation command to the printer 2 according to the communication format included in the startup options. In a case that it is possible to communicate with the printer 2 through a plurality of communication formats, the preceding operation command is outputted to the printer 2 using a different communication format than the communication format for transmitting the print image data, and thus output of the preceding operation command does not affect transmission of the print image data, thereby avoiding problems such as a delay in one causing a delay in the other.

After starting up the command transmission application 44 or in a case that the post-process auxiliary program 422 determines in S402 that the restriction condition is met (S402: YES), in S403 (arrow L1 in FIG. 8) the post-process auxiliary program 422 transfers the completion notification to the OS 21 and subsequently ends the post-process.

In the procedure described above, the post-process auxiliary program 422 selects a communication format for transmitting the preceding operation command, but this selection may be made by the command transmission application 44 instead. In the latter case, the post-process auxiliary program 422 transfers information indicating the communication format for transmitting the print image data to the command transmission application 44. Further, in the above procedure the post-process auxiliary program 422 acquires model information and access information of the printer 2 from the OS 21 for transmitting the preceding operation command, and transfers this information to the command transmission application 44. However, the post-process auxiliary program 422 may simply transfer information identifying the printer 2 to the command transmission application 44, and the command transmission application 44 may acquire the model information and access information of the printer 2 from the OS 21.

In the first embodiment described above, when the print instruction is issued to perform the printing operation on the printer 2 using the universal printing program 41, the auxiliary program 42 controls the command transmission application 44, which has a function for outputting the preceding operation command, to output the preceding operation command to execute the printer-specific preceding operation while the auxiliary program 42 designates the printer 2 targeted in the print instruction as the outputting destination. Through this process, the printer 2 can execute the printer-specific preceding operation even in a case that the PC 1 received the print instruction to execute the print using the universal printing program 41, thereby utilizing the full capacity of the printer.

Further, the auxiliary program 42 of the second embodiment starts up the command transmission application 44 when the preceding operation command must be outputted, and the command transmission application 44 automatically outputs the preceding operation command upon startup and subsequently terminates. Since the process to output the preceding operation command is automatically completed simply by starting up the command transmission application 44, the process of the auxiliary program 42 is simpler than when the auxiliary program 42 executed separate commands to start up the command transmission application 44 and to output the preceding operation command.

Figure 11:
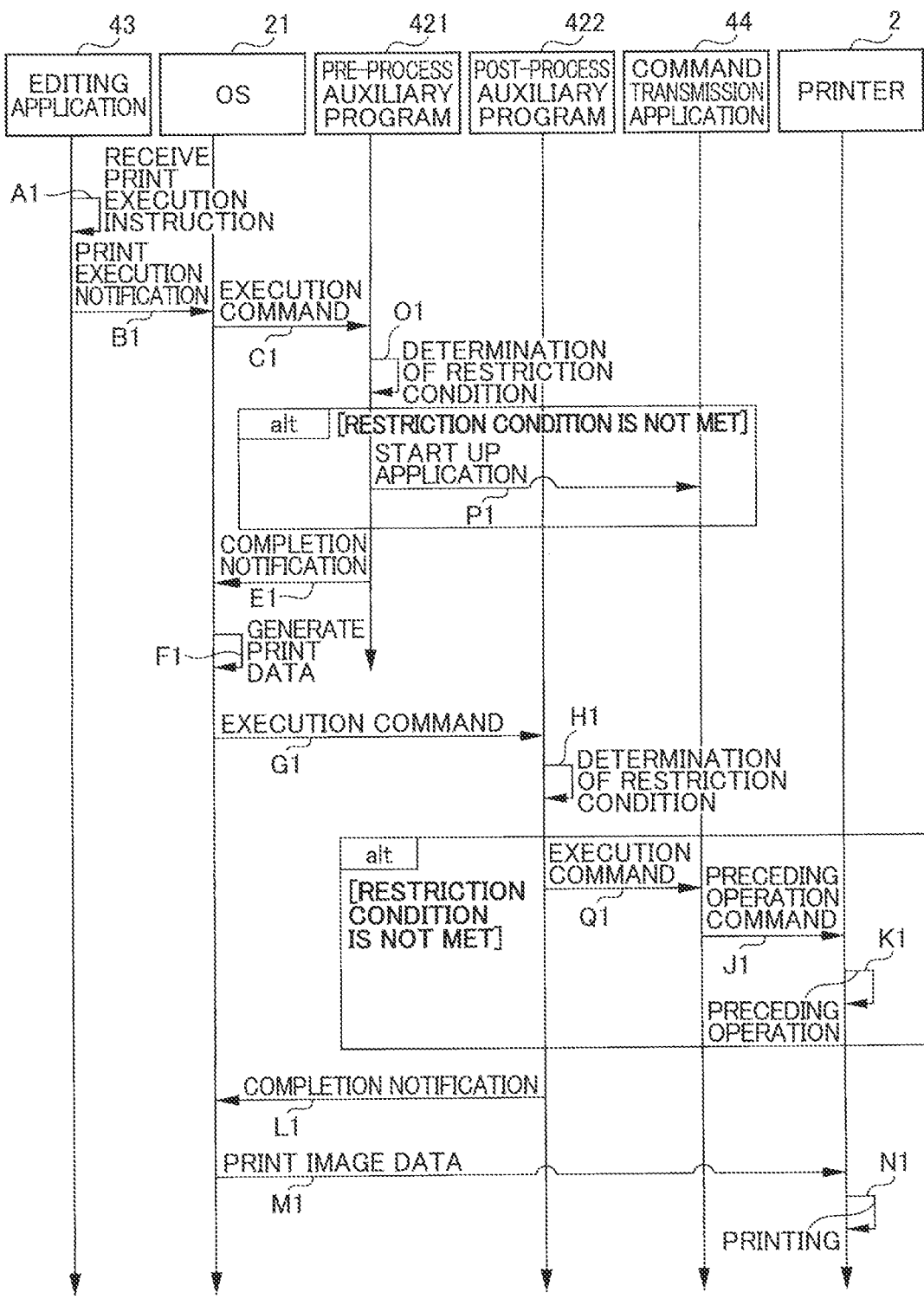
FIG. 11 is a sequence diagram illustrating exemplary operation of each program according to a modification of the second embodiment.

Next, a printing process performed on a printing system including the operations of the auxiliary program 42 will be described according to a modification of the second embodiment with reference to the sequence diagram in FIG. 11. The modification of the second embodiment differs from the second embodiment in that the command transmission application 44 is started up in the pre-process. The modification of the second embodiment also differs from the second embodiment in that the command transmission application 44 does not immediately output a command after starting up. Steps indicated in FIG. 11 that are equivalent to those in the second embodiment shown in FIG. 8 are designated with the same reference symbols. Further, since the portion of the modification of the second embodiment from arrow A1 to arrow C1 is identical to that in the second embodiment shown in FIG. 8, a description of this portion will be omitted.

In a case that the OS 21 outputs to the auxiliary program 42 a command to execute the pre-process (arrow C1 in FIG. 11), the pre-process auxiliary program 421 of the auxiliary program 42 determines whether the restriction condition is met as part of the pre-process (arrow O1). Here, the restriction condition may be the same condition described for arrow H1 in the second embodiment, for example.

In a case that the restriction condition is not met, the pre-process auxiliary program 421 starts up the command transmission application 44 (arrow P1). The process in arrow P1 is an example of the startup process. In this embodiment, the pre-process auxiliary program 421 merely starts up the command transmission application 44. Startup options provided with the startup command do not include transmission information for the method of transmission.

After the pre-process auxiliary program 421 has started up the command transmission application 44 or in a case that the restriction condition is met, the pre-process auxiliary program 421 transfers a completion notification to the OS 21 (arrow E1). In response to reception of the completion notification from the pre-process auxiliary program 421, the OS 21 uses the universal printing program 41 to generate print data (arrow F1) and outputs an execution command to the auxiliary program 42 to execute the post-process (arrow G1).

In a case that the execution command for the post-process is received by the auxiliary program 42, the post-process auxiliary program 422 determines whether the restriction condition is met as part of the post-process (arrow H1). In a case that the restriction condition is not met, the post-process auxiliary program 422 outputs an execution command for the process of the command transmission application 44 (arrow Q1). The process of arrow Q1 is an example of the command input process. As with the startup options provided in the second embodiment when starting up the command transmission application 44, the execution command for the process of the command transmission application 44 in the modification of the second embodiment includes model information or address information of the printer 2 to be the destination of commands, and information specifying the communication format.

When the execution command is received from the post-process auxiliary program 422, the command transmission application 44 uses information included in the execution command to output the preceding operation command to the printer 2 (arrow J1). Upon receiving the preceding operation command from the PC 1, the printer 2 starts the preceding operation (arrow K1). The processes in the modification of the second embodiment from arrow L1 to arrow N1 are identical to those in the second embodiment and, hence, a description of the processes will not be repeated.

As described above, even with the auxiliary program 42 configured according to the modification of the second embodiment, the command transmission application 44 outputs the preceding operation command in a case that the PC 1 receives the print instruction to execute the print using the universal printing program 41. Accordingly, the printer 2 can execute the printer-specific preceding operation, thereby utilizing the full capacity of the printer.

Further, by separating the process for starting up the command transmission application 44 and the process for inputting the execution command into the command transmission application 44, the auxiliary program 42 of the modification of the second embodiment can start up the command transmission application 44 in advance. Thus, the command transmission application 44 can promptly transmit the preceding operation command to the printer 2 after the auxiliary program 42 inputs the command to output the preceding operation command. Accordingly, the printer 2 can more quickly start executing the preceding operation. In a case that a preview display is performed to display an image represented by the print image data, for example, the command transmission application 44 transmits the preceding operation command after the user has selected the print option in the preview display. Since the command transmission application 44 has been started up in advance, the command transmission application 44 can more quickly transmit the preceding operation command than when started up after the print option was selected.

The second embodiment and the modification of the second embodiment may further be modified as follows. The command transmission application 44 may be an application dedicated only to outputting preceding operation commands or an application capable of transmitting other commands. For example, when the printer 2 has a device-specific function, such as a colorant saving mode, the command transmission application 44 may transmit a command to the printer 2 for enabling this device-specific function. The command transmission application 44 may also have other functions than a function for transmitting commands.

Further, the command transmission application 44 may be installed on the same device on which the auxiliary program 42 is installed, as in the second embodiment and the modification of the second embodiment described above, or may be installed on a separate device. For example, the command transmission application 44 may be installed on a server connected to the PC 1.

While the invention has been described in detail with reference to specific embodiments thereof, it would be apparent to those skilled in the art that many modifications and variations may be made therein without departing from the scope of the invention. For example, the device connected to the PC 1 may be any device having a printing function, such as a multifunction peripheral, a copy machine, or a facsimile machine, and is not limited to a printer. Further, a plurality of printers rather than just one may be connected to the PC 1.

While the auxiliary program 42 in the embodiments is provided with both the pre-process and the post-process, the auxiliary program 42 may be configured only of the post-process auxiliary program 422 that is activated after print data has been generated. Additionally, the pre-process auxiliary program 421 and the post-process auxiliary program 422 may be provided as a single module or as separate modules.

The printing parameters may also be transmitted as the preceding operation command. In this case, upon receiving printing parameters, the printer 2 executes a preliminary operation for color printing if the printing parameters include a color print setting and executes a preliminary operation for black-only printing when the printing parameters indicate a monochrome print setting.

In a case that the printer 2 is a laser printer, the preliminary operation for color printing may be a calibration process to suppress color drift. Further, in a case that the printer 2 is a model provided with a finisher and the printing parameters include a process using the finisher, the printer 2 may perform a preliminary operation for the finisher upon receiving the printing parameters.

The module that executes the pre-process and the post-process is not limited to the auxiliary program 42 but may be any program that receives commands from the OS 21 when the universal printing program 41 of the OS 21 performs the print. For example, a print workflow application having specifications published by Microsoft Corporation may be used as the program.

In the embodiments, the auxiliary program 42 is started up by the execution command outputted from the OS 21, but the start timing of the auxiliary program 42 is not limited to this example. For example, the auxiliary program 42 may be running continuously in the background and may perform the above operations upon receiving the execution command.

In any of the flowcharts disclosed in the embodiments, the plurality of processes that make up any of the plurality of steps may be executed in parallel, or the order in which the processes are performed may be modified in any way that does not produce any inconsistencies in the processes.

The processes in the embodiments may be performed by a single CPU, a plurality of CPU, hardware such as an ASIC, or a combination of these components. The processes in the embodiments may be achieved by a storage medium storing a program for executing these processes or other manners such as a method.

Any processes in the embodiments and their modifications can be combined unless such combinations produce inconsistencies.

What is claimed is:

1. A non-transitory computer readable storage medium storing a support program installed on and executed by a computer in an information processing device, the support program supporting a printer connected to the information processing device, the information processing device being a device different from the printer, the information processing device including a communication interface and an operating system installed therein, a printing program being built in the operating system,
wherein the support program is an application supporting a model of the printer,
wherein the support program, when executed by the computer, causes the information processing device to perform:
in a case that a print instruction to execute printing on the printer by using the built-in printing program is issued, at least one of a command outputting process and an outputting instruction process,
wherein the command outputting process is to output a preceding operation command to the printer via the communication interface before starting transmitting print execution data to the printer, the print execution data being based on print data which the operating system generates according to the built-in printing program, the preceding operation command being for commanding the printer to execute a preceding printer function operation prior to starting printing, the printer having a function to execute the preceding operation corresponding to the preceding operation command,
wherein the outputting instruction process is to instruct a command transmission program to output the preceding operation command while the outputting instruction process designates the printer as an outputting destination, the command transmission program having a function to output the preceding command to the printer which is designated as the outputting destination, wherein the command transmission program is an application supporting the model of the printer, wherein the command transmission program is installed on the information processing device; and
wherein the preceding printer function operation includes at least one of:
an operation removing a cap from a print head, the print head and the cap being provided in the printer, the cap being used to prevent ink from drying;
an operation moving the print head to a print start position;
an operation preheating a fixing unit provided in the printer; and
an operation conveying a sheet of paper from a paper tray, which is provided in the printer, to a prescribed cuing position.

2. The non-transitory computer readable storage medium according to claim 1, wherein the command outputting process is performed after the operating system completes generating the printing data according to the printing program.

3. The non-transitory computer readable storage medium according to claim 2, wherein the support program, when executed by the computer, causes the information processing device to further perform a preview process after the operating system completes generating the printing data and before the print execution data is transmitted to the printer, the preview process being to display an image represented by the print execution data on a display included in the information processing device and to receive an instruction indicating whether a printing is performed based on the print execution data,
wherein the command outputting process is performed after the preview process is performed.

4. The non-transitory computer readable storage medium according to claim 1, wherein the support program, when executed by the computer, causes the information processing device to further perform an operation reception process to receive a user operation via an input interface included in the information processing device before transmission of the print execution data to the printer starts in a case that the print instruction is issued,
wherein the command outputting process is performed after the user operation is received in the operation reception process.

5. The non-transitory computer readable storage medium according to claim 1, wherein the outputting instruction process includes:
designating the printer by using a startup option of the command transmission program; and
instructing the command transmission program to output the preceding operation command by starting up the command transmission program, the command transmission program outputting the preceding operation command to the printer which is designated by the startup option.

6. The non-transitory computer readable storage medium according to claim 1, wherein the outputting instruction process includes:
a startup process to start up the command transmission program; and
an instruction inputting process to input an outputting instruction into the command transmission program while designating the printer as the outputting destination,
wherein in a case that the command transmission program is started and thereafter the outputting instruction is inputted into the started command transmission program, the command transmission program outputs the preceding operation command to the printer designated by the outputting instruction.

7. The non-transitory computer readable storage medium according to claim 6, wherein the startup process is performed before the operating system starts generating print data according to the built-in printing program,
wherein the instruction inputting process is performed after the operating system completes generating the print data according to the built-in printing program.

8. The non-transitory computer readable storage medium according to claim 1, wherein the outputting instruction process controls the command transmission program to output the preceding operation command in a first communication format while designating the printer as an outputting destination, the first communication format being different from a second communication format in which the print execution data is transmitted.

9. The non-transitory computer readable storage medium according to claim 8, wherein the outputting instruction process controls the command transmission program to output the preceding operation command while designating the first communication format in which the preceding operation command is to be transmitted.

10. The non-transitory computer readable storage medium according to claim 1, wherein the preceding operation is a setting process for settings specific to the model of the printer.

11. The non-transitory computer readable storage medium according to claim 1, wherein the support program, when executed by the computer, causes the information processing device to further perform:
- a setting process for settings specific to the model of the printer before the preceding operation command is outputted to the printer.

12. A non-transitory computer readable storage medium storing a support program installed on and executed by a computer in an information processing device, the support program supporting a printer connected to the information processing device, the information processing device being a device different from the printer, the information processing device including a communication interface and an operating system installed therein, a printing program being built in the operating system,
- wherein the support program is an application supporting a model of the printer,
- wherein the support program, when executed by the computer, causes the information processing device to perform:
- in a case that a print instruction to execute printing on the printer by using the built-in printing program is issued, at least one of a command outputting process and an outputting instruction process,
- wherein the command outputting process is to output a preceding operation command to the printer via the communication interface before starting transmitting print execution data to the printer, the print execution data being based on print data which the operating system generates according to the built-in printing program, the preceding operation command being for commanding the printer to execute a preceding printer function operation prior to starting printing, the printer having a function to execute the preceding operation corresponding to the preceding operation command,
- wherein the outputting instruction process is to instruct a command transmission program to output the preceding operation command while the outputting instruction process designates the printer as an outputting destination, the command transmission program having a function to output the preceding command to the printer which is designated as the outputting destination,
- wherein the command transmission program is an application supporting the model of the printer, wherein the command transmission program is installed on the information processing device,
- wherein the support program, when executed by the computer, causes the information processing device to further perform a first determination process before the operating system completes generating the printing data according to the printing program, the first determination determining whether a condition is met, the condition including a condition that execution or non-execution of printing remains undetermined at a time before the operating system completes generating the printing data and the execution or non-execution of printing is determined at a time after the operating system completes generating the printing data,
- wherein in a case that the condition is met, the command outputting process is performed after the operating system completes generating the printing data, and
- wherein in a case that the condition is not met, the command outputting process is performed before the operating system completes generating the printing data.

13. The non-transitory computer readable storage medium according to claim 12, wherein the support program, when executed by the computer, causes the information processing device to further perform a preview process after the operating system completes generating the printing data according to the printing program and before the print execution data based on the generated printing data is transmitted to the printer, the preview process being to display an image represented by the print execution data on a display included in the information processing device and to receive an instruction indicating whether a printing is performed based on the print execution data,
- wherein in a case that settings to execute the preview process are enabled, determination is made in the first determination process such that the condition is met,
- wherein the command outputting process is performed after the preview process is performed.

14. An information processing device comprising:
- a communication interface;
- a memory storing an operating system and a support program, the support program supporting a printer connected to the information processing device, the information processing device being a device different from the printer, a printing program being built in the operating system; and
- a computer,
- wherein the support program is an application supporting a model of the printer,
- wherein the support program, when executed by the computer, causes the information processing device to perform:
- in a case that a print instruction to execute printing on the printer by using the built-in printing program is issued, at least one of a command outputting process and an outputting instruction process,
- wherein the command outputting process is to output a preceding operation command to the printer via the communication interface before starting transmitting print execution data to the printer, the print execution data being based on print data which the operating system generates according to the built-in printing program, the preceding operation command being for commanding the printer to execute a preceding printer function operation prior to starting printing, the printer having a function to execute the preceding operation specified in the preceding operation command,
- wherein the outputting instruction process is to instruct a command transmission program to output the preceding operation command while the outputting instruction process designates the printer as an outputting destination, the command transmission program having a function to output the preceding command to the printer which is designated as the outputting destination, wherein the command transmission program is an application supporting the model of the printer, wherein the command transmission program is installed on the information processing device,
- wherein the command transmission program, when executed by the computer, causes the information processing device to perform:
- in a case that the support program instructs the command transmission program to output the preceding operation command, outputting the preceding command to the designated printer via the communication interface;
- wherein the preceding printer function operation includes at least one of:

an operation removing a cap from a print head, the print head and the cap being provided in the printer, the cap being used to prevent ink from drying;

an operation moving the print head to a print start position;

an operation preheating a fixing unit provided in the printer; and an operation conveying a sheet of paper from a paper tray, which is provided in the printer, to a prescribed cuing position.

15. The non-transitory computer readable storage medium according to claim 14, wherein the support program, when executed by the computer, causes the information processing device to further perform a reception process to receive setting of a password correlated with the print execution data, wherein in a case that the password is set, the print execution data to be transmitted to the printer is correlated with the password, wherein the printer has a function to perform printing using the print execution data under the prescribed condition indicating that the password is inputted into the printer in a case that the printer receives the print execution data correlated with the password, wherein in a case that the password is received, determination is made in the determination process such that the condition is met.

16. A printing method for controlling an information processing device on which a support program is installed, the support program supporting a printer connected to the information processing device, the information processing device being a device different from the printer, the information processing device including an operating system installed therein, a printing program being built in the operating system, wherein the support program is an application supporting a model of the printer, the printing method comprising:

in a case that a print instruction to execute printing on the printer by using the built-in printing program is issued, performing at least one of a command outputting process and an outputting instruction process according to the support program, wherein the command outputting process is to output a preceding operation command to the printer from the information processing device before starting transmitting print execution data to the printer, the print execution data being based on print data which the operating system generates according to the built-in printing program, the preceding operation command being for commanding the printer to execute a preceding printer function operation prior to starting printing, the printer having a function to execute the preceding operation specified in the preceding operation command, wherein the outputting instruction process is to instruct a command transmission program to output the preceding operation command while the outputting instruction process designates the printer as an outputting destination, wherein the command transmission program is an application supporting the model of the printer, wherein the command transmission program is installed on the information processing device, wherein the printing method further includes, in a case that the support program instructs the command transmission program to output the preceding operation command, outputting the preceding command to the designated printer according to the command transmission program;

wherein the preceding printer function operation includes at least one of:

an operation removing a cap from a print head, the print head and the cap being provided in the printer, the cap being used to prevent ink from drying;

an operation moving the print head to a print start position;

an operation preheating a fixing unit provided in the printer; and an operation conveying a sheet of paper from a paper tray, which is provided in the printer, to a prescribed cuing position.

17. The information processing device according to claim 16, wherein the command outputting process is performed after the operating system completes generating the printing data according to the printing program.

18. A non-transitory computer readable storage medium storing a program set installed on and executed by a computer in an information processing device, the program set comprising a support program and a command transmission program, the support program supporting a printer connected to the information processing device, the information processing device being a device different from the printer, the information processing device including a communication interface and an operating system installed therein, a printing program being built in the operating system, wherein the support program is an application supporting a model of the printer, wherein the support program, when executed by a computer, causes the information processing device to perform:

in a case that a print instruction to execute printing on the printer by using the built-in printing program is issued, an outputting instruction process to output a preceding operation command to instruct the command transmission program to output a preceding operation command while the outputting instruction process designates the printer as an outputting destination, the preceding operation command being for commanding the printer to execute a preceding printer function operation prior to starting printing, wherein the command transmission program, when executed by a computer, causes the information processing device to perform:

in a case that the support program instructs the command transmission program to output the preceding operation command, a command outputting process to output the preceding command to the designated printer, the printer having a function to execute the preceding operation specified in the preceding operation command, wherein the command transmission program is an application supporting the model of the printer, wherein the command transmission program is installed on the information processing device;

wherein the preceding printer function operation includes at least one of:

an operation removing a cap from a print head, the print head and the cap being provided in the printer, the cap being used to prevent ink from drying;

an operation moving the print head to a print start position;

an operation preheating a fixing unit provided in the printer; and an operation conveying a sheet of paper from a paper tray, which is provided in the printer, to a prescribed cuing position.

19. The printing method according to claim 18, wherein the command outputting process is performed after the operating system completes generating the printing data according to the printing program.

20. A non-transitory computer readable storage medium storing a program set installed on and executed by a computer in an information processing device, the program set comprising a support program and a command transmission program, the support program supporting a printer connected to the information processing device, the information processing device being a device different from the printer, the information processing device including a communication interface and an operating system installed therein, a printing program being built in the operating system,
- wherein the support program is an application supporting a model of the printer,
- wherein the support program, when executed by a computer, causes the information processing device to perform:
  - in a case that a print instruction to execute printing on the printer by using the built-in printing program is issued, an outputting instruction process to output a preceding operation command to instruct the command transmission program to output a preceding operation command while the outputting instruction process designates the printer as an outputting destination, the preceding operation command being for commanding the printer to execute a preceding printer function operation prior to starting printing,
- wherein the command transmission program, when executed by a computer, causes the information processing device to perform:
  - in a case that the support program instructs the command transmission program to output the preceding operation command, a command outputting process to output the preceding command to the designated printer, the printer having a function to execute the preceding operation specified in the preceding operation command, wherein the command transmission program is an application supporting the model of the printer, wherein the command transmission program is installed on the information processing device;
- wherein the preceding printer function operation includes at least one of:
  - an operation removing a cap from a print head, the print head and the cap being provided in the printer, the cap being used to prevent ink from drying;
  - an operation moving the print head to a print start position;
  - an operation preheating a fixing unit provided in the printer; and
  - an operation conveying a sheet of paper from a paper tray, which is provided in the printer, to a prescribed cuing position.

21. The non-transitory computer readable storage medium according to claim 20, wherein the outputting instruction process includes:
- designating the printer by using a startup option of the command transmission program; and
- instructing the command transmission program to output the preceding operation command by starting up the command transmission program, the command transmission program outputting the preceding operation command to the printer which is designated by the startup option,
- wherein the command outputting process according to the command transmission program outputs the preceding operation command to the printer designated by the startup option.

22. The non-transitory computer readable storage medium according to claim 20, wherein the outputting instruction process includes:
- a startup process to start up the command transmission program; and
- an instruction inputting process to input an outputting instruction into the command transmission program while designating the printer as the outputting destination,
- wherein in a case that the command transmission program is started and thereafter the outputting instruction is inputted into the started command transmission program, the command transmission program according to the command transmission program outputs the preceding operation command to the printer designated by the outputting instruction.

23. The non-transitory computer readable storage medium according to claim 20, wherein the outputting instruction process controls the command transmission program to output the preceding operation command in a first communication format while designating the printer as an outputting destination, the first communication form being different from a second communication format in which the print execution data is transmitted.

* * * * *